(12) United States Patent
Lee et al.

(10) Patent No.: US 11,457,491 B2
(45) Date of Patent: Sep. 27, 2022

(54) ELECTRONIC DEVICE TO SUPPORT DUAL CONNECTIVITY AND OPERATING METHOD THEREOF

(71) Applicant: Samsung Electronics Co., Ltd., Suwon-si (KR)

(72) Inventors: Keonyoung Lee, Suwon-si (KR); Daejun Kang, Suwon-si (KR); Yongjae Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 17/011,340

(22) Filed: Sep. 3, 2020

(65) Prior Publication Data

US 2021/0076438 A1    Mar. 11, 2021

(30) Foreign Application Priority Data

Sep. 9, 2019  (KR) .................. 10-2019-0111369

(51) Int. Cl.
| | |
|---|---|
| *H04W 76/15* | (2018.01) |
| *H04W 36/00* | (2009.01) |
| *H04W 8/24* | (2009.01) |

(52) U.S. Cl.
CPC .......... *H04W 76/15* (2018.02); *H04W 8/245* (2013.01); *H04W 36/0058* (2018.08); *H04W 36/0069* (2018.08); *H04W 36/00837* (2018.08)

(58) Field of Classification Search
None
See application file for complete search history.

(56) References Cited

U.S. PATENT DOCUMENTS 9,844,047 B2 * 12/2017 Fukuta .................. H04W 8/24
2014/0242993 A1    8/2014 Dahlen et al.
(Continued)

FOREIGN PATENT DOCUMENTS

| EP | 3247153 A1 * | 11/2017 | ............ H04W 48/00 |
|---|---|---|---|
| EP | 3599787 A1 * | 1/2020 | ........... H04B 1/7083 |

(Continued)

OTHER PUBLICATIONS

CMCC et al., Discussion on EN-DC cell reselection, R2-1909450, 3GPP TSG-RAN WG2 Meeting #107, Prague, Czech Republic, Aug. 16, 2019, section 2.

(Continued)

*Primary Examiner* — Kevin D Mew
(74) *Attorney, Agent, or Firm* — Jefferson IP Law, LLP

(57) ABSTRACT

An electronic device is provided. The electronic device includes at least one communication processor configured to support a first network communication and a second network communication, and a memory configured to store information about at least one first band supporting dual connectivity for the first network communication and the second network communication among a plurality of bands which correspond to the first network communication supported by the electronic device, and the at least one communication processor may be configured to camp on a first cell supporting the first network communication, after camping on the first cell, perform a measurement on at least some of the at least one first band among the plurality of bands in an idle state, and perform a cell reselection based on a measurement result for the at least some of the at least one first band. Herein, a measurement on a remaining band except for the at least one first band among the plurality of bands may not be performed.

16 Claims, 24 Drawing Sheets

(56) References Cited

U.S. PATENT DOCUMENTS

| | | | |
|---|---|---|---|
| 2016/0073312 A1* | 3/2016 | Sridhar | H04W 48/16 |
| | | | 370/235 |
| 2017/0064691 A1 | 3/2017 | Kubota et al. | |
| 2017/0215185 A1 | 7/2017 | Fukuta et al. | |
| 2017/0359759 A1 | 12/2017 | Brown et al. | |
| 2019/0268819 A1* | 8/2019 | Kim | H04W 36/0085 |
| 2019/0349822 A1* | 11/2019 | Kim | H04W 36/08 |
| 2020/0367085 A1* | 11/2020 | Hong | H04W 72/085 |

FOREIGN PATENT DOCUMENTS

| | | | | | |
|---|---|---|---|---|---|
| GB | 2539243 A | * | 12/2016 | | |
| KR | 20200069207 A | * | 6/2019 | | H04W 74/002 |
| WO | WO-2005109687 A1 | * | 11/2005 | | H04W 48/20 |
| WO | WO-2014089069 A1 | * | 6/2014 | | H04W 16/14 |
| WO | WO-2018175891 A1 | * | 9/2018 | | H04L 1/0026 |

OTHER PUBLICATIONS

Sprint, LTE upperLayerIndication IE and application to 5G icon, R2-1910799, 3GPP TSG-RAN WG2 Meeting #107, Prague, Czech Republic, Aug. 15, 2019, section 4.

3rd Generation Partnership Project; Technical Specification Group Core Network and Terminals; Non-Access-Stratum (NAS) protocol for Evolved Packet System (EPS); Stage 3 (Release 15), 3GPP TS 24.301 V15.7.0, Jun. 14, 2019, pp. 157-163, 428.

International Search Report dated Dec. 3, 2020, issued in International Application No. PCT/KR2020/011918.

\* cited by examiner

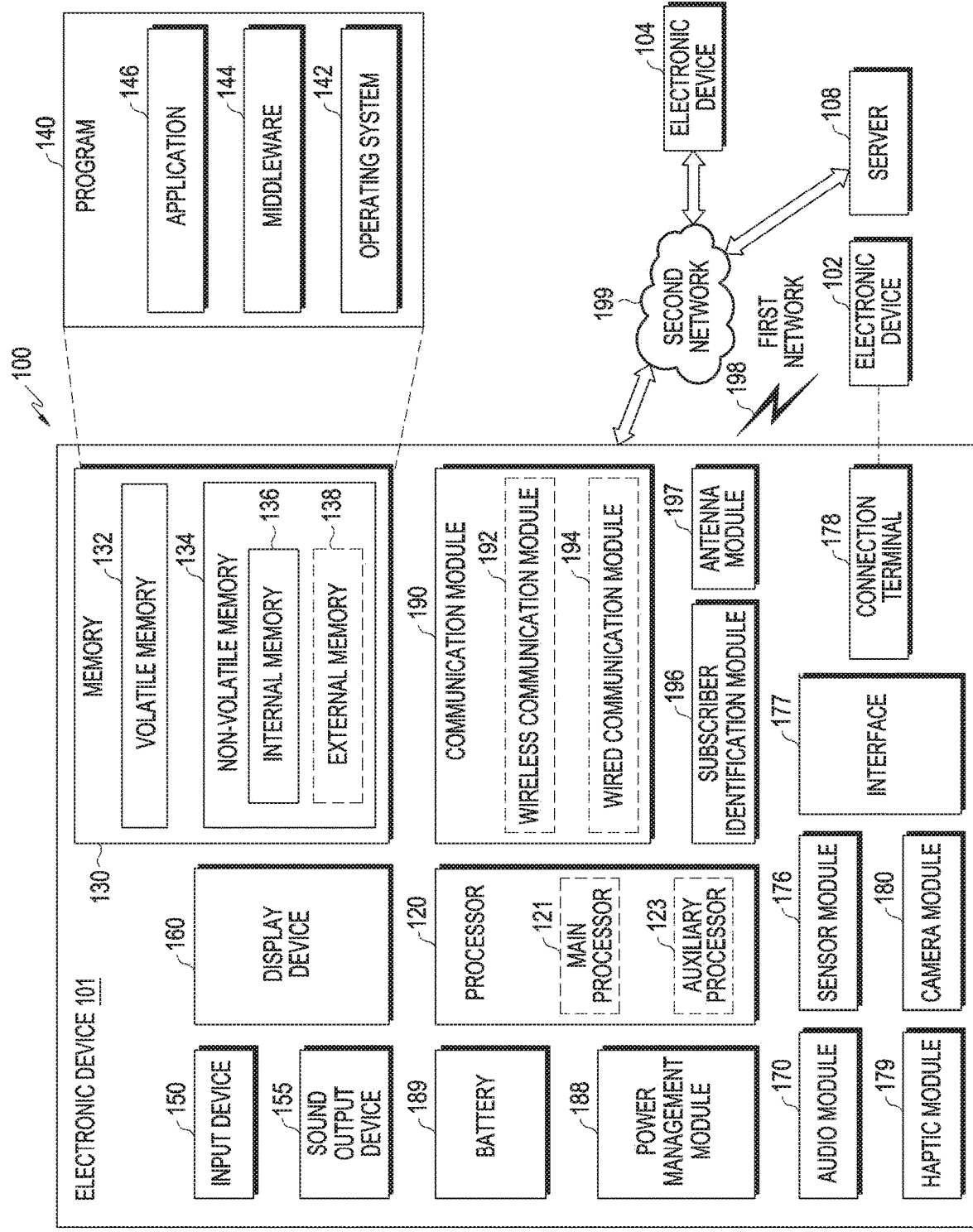

ELECTRONIC DEVICE TO SUPPORT DUAL CONNECTIVITY AND OPERATING METHOD THEREOF

CROSS-REFERENCE TO RELATED APPLICATION(S)

This application is based on and claims priority under 35 U.S.C. § 119(a) of a Korean patent application number 10-2019-0111369, filed on Sep. 9, 2019, in the Korean Intellectual Property Office, the disclosure of which is incorporated by reference herein in its entirety.

BACKGROUND

1. Field

The disclosure relates to an electronic device to support dual connectivity and an operating method thereof.

2. Description of Related Art

Along with the development of mobile communication technology, portable terminals equipped with various functions have recently become popular, and efforts have been made to develop $5^{th}$ generation (5G) communication systems to meet the increasing demands for wireless data traffic. In order to achieve high data rates, implementation of 5G communication systems in ultra-high frequency bands as well as in the high frequency bands used in $3^{rd}$ generation (3G) and long term evolution (LTE) is under consideration to provide faster data rates.

For implementation of 5G communication, a stand-alone (SA) scheme and a non-stand alone (NSA) scheme are considered. The NSA scheme enables use of a new radio (NR) system together with the legacy LTE system. In the NSA scheme, a user equipment (UE) may communicate with a next-generation Node B (gNB) (or a secondary gNB (SgNB)) of the NR system as well as an evolved Node B (eNB) of the LTE system. A technology that enables a UE to use heterogeneous communication systems may be referred to as dual connectivity.

Dual connectivity was first proposed under 3rd generation partnership project (3GPP) Release-12. The first proposed dual connectivity was for using an LTE system as a large cell and a small cell. In the 5G evolved-universal terrestrial radio access (E-UTRA) new radio dual connectivity (EN-DC) scheme, implementation that, based on the dual connectivity, an LTE network communication is used as a master node and an NR network communication is used as a secondary node is under consideration.

The above information is presented as background information only to assist with an understanding of the disclosure. No determination has been made, and no assertion is made, as to whether any of the above might be applicable as prior art with regard to the disclosure.

SUMMARY

A plurality of bands may be defined in an LTE network communication. A part of the plurality of bands may support EN-DC, and another part of the plurality of bands may not support the EN-DC. If an electronic device (e.g., a user equipment (UE)) camps on an LTE cell which does not support the EN-DC and is subsequently connected (e.g., radio resource control (RRC) connected), an EN-DC service may not be provided to the electronic device. For supporting the EN-DC service, the electronic device needs to camp on a cell of a band supporting the EN-DC. Alternatively, there is a possibility that the electronic device hands over to an LTE cell of a band which does not support the EN-DC after being connected to an LTE cell (e.g., RRC connected). In this case, the EN-DC service may not be provided to the electronic device. For supporting the EN-DC service, the electronic device needs to hand over to a cell of a band supporting the EN-DC.

Aspects of the disclosure are to address at least the above-mentioned problems and/or disadvantages and to provide at least the advantages described below. Accordingly, an aspect of the disclosure is to provide an electronic device which may camp on or hand over to a cell which corresponds to a frequency supporting dual connectivity and an operating method thereof.

Additional aspects will be set forth in part in the description which follows and, in part, will be apparent from the description, or may be learned by practice of the presented embodiments.

In accordance with an aspect of the disclosure, an electronic device is provided. The electronic device includes at least one communication processor configured to support a first network communication and a second network communication, and a memory configured to store information about at least one first band supporting dual connectivity for the first network communication and the second network communication among a plurality of bands which correspond to the first network communication supported by the electronic device, and the at least one communication processor may be configured to camp on a first cell supporting the first network communication, after camping on the first cell, perform a measurement on at least some of the at least one first band among the plurality of bands in an idle state, and perform a cell reselection based on a measurement result for the at least some of the at least one first band. Here, a measurement on a remaining band except for the at least one first band among the plurality of bands may not be performed.

In accordance with another aspect of the disclosure, an electronic device is provided. The electronic device includes at least one communication processor configured to support a first network communication and a second network communication, and a memory configured to store information about at least one first band supporting dual connectivity for the first network communication and the second network communication among a plurality of bands which correspond to the first network communication supported by the electronic device, and the at least one communication processor may be configured to connect to a first cell supporting the first network communication, while being connected to the first cell, perform a measurement on at least some of the at least one first band among the plurality of bands, and perform at least some of a handover procedure based on a measurement result for the at least some of the at least one first band. Here, a measurement on a remaining band except for the at least one first band among the plurality of bands may not be performed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 1 is a block diagram illustrating an electronic device in a network environment according to an embodiment of the disclosure;

Throughout the drawings, it should be noted that like reference numbers are used to depict the same or similar elements, features, and structures.

DETAILED DESCRIPTION

Figure 2A:
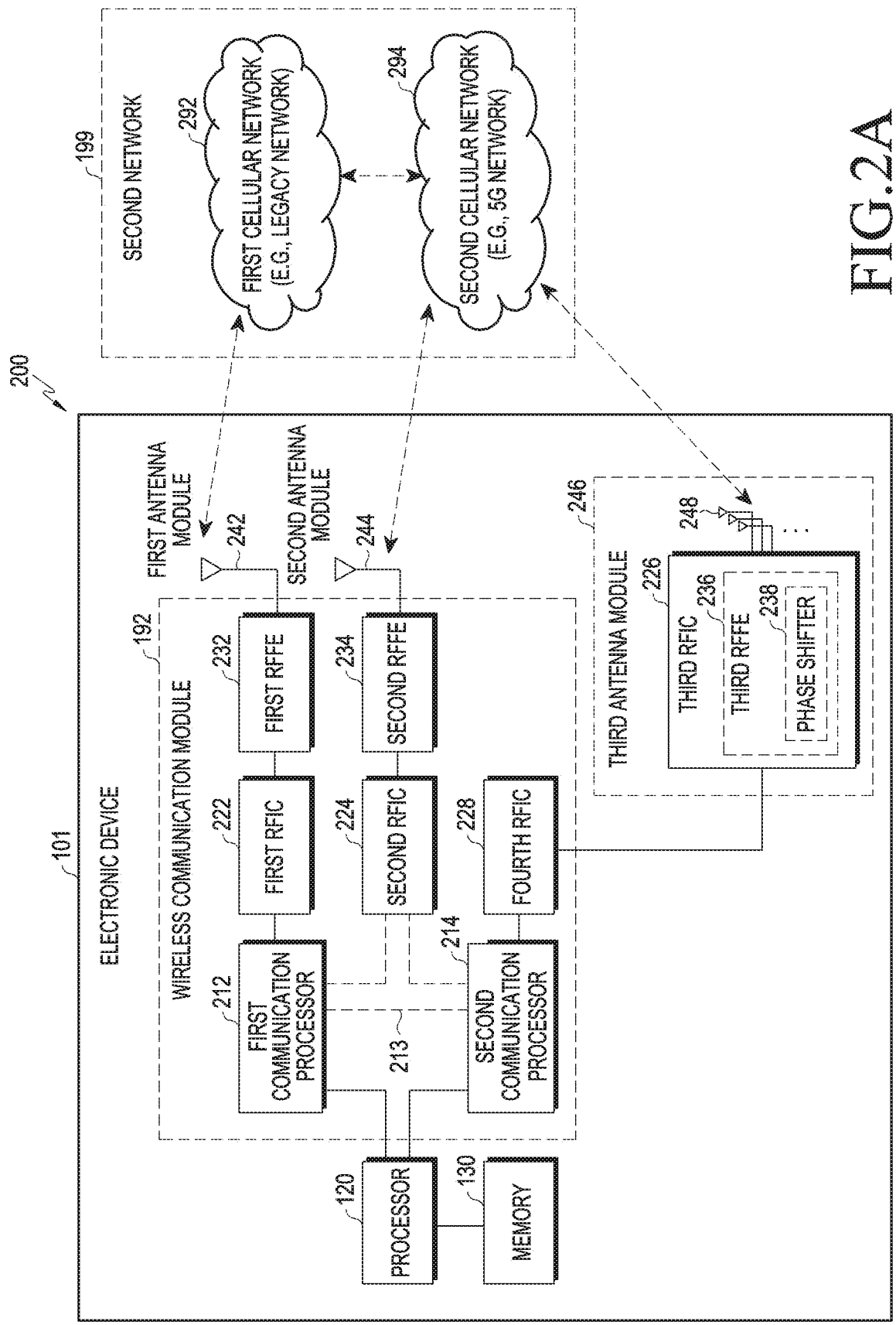
FIG. 2A is a block diagram illustrating an electronic device for supporting a legacy network communication and a 5th generation (5G) network communication according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment of the disclosure, the electronic device 101 may communicate with the electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include one antenna including a radiating element composed of a conductive material or a conductive pattern formed in or on a substrate (e.g., printed circuit board (PCB)). According to an embodiment of the disclosure, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 and 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

FIG. 2A is a block diagram 200 illustrating an electronic device 101 for supporting a legacy network communication and a 5th generation (5G) network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first cellular network 292 and a second cellular network 294. According to another embodiment of the disclosure, the electronic device 101 may further include at least one of the components illustrated in FIG. 1, and the second network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may form at least part of a wireless communication module 192. According to an embodiment of the disclosure, the fourth RFIC 228 may be omitted or included as part of the third RFIC 226.

The first communication processor 212 may establish a communication channel in a band to be used for a wireless communication with the first cellular network 292 and support a legacy network communication through the established communication channel. According to various embodiments of the disclosure, the first cellular network 292 may be a legacy network including a $2^{nd}$ generation (2G), $3^{rd}$ generation (3G), $4^{th}$ generation (4G), or LTE network. The second communication processor 214 may establish a communication channel corresponding to a specified band (e.g., about 6 gigahertz (GHz) to about 60 GHz) out of a band to be used for a wireless communication with the second cellular network 294 and support a 5G network communication through the established communication channel. According to various embodiments of the disclosure, the second cellular network 294 may be a 5G network defined by the 3GPP. Additionally, according to an embodiment of the disclosure, the first communication processor 212 or the second communication processor 214 may establish a communication channel corresponding to another specified band (e.g., about 6 GHz or less) out of the band to be used for the wireless communication with the second cellular network 294 and support a 5G network communication through the established communication channel.

The first communication processor 212 may transmit and receive data to and from the second communication processor 214. For example, data supposed to be transmitted through a second cellular network 294 may be scheduled to be transmitted through a first cellular network 292. In this case, the first communication processor 212 may receive transmission data from the second communication processor 214.

For example, the first communication processor 212 may transmit and receive data to and from the second communication processor 214 through an inter-processor interface 213. The inter-processor interface 213 may be configured as, but not limited to, a universal asynchronous receiver/transmitter (UART) (e.g., high speed-UART (HS-UART)) interface or a peripheral component interconnect bus express (PCIe) interface. Alternatively, the first communication processor 212 and the second communication processor 214 may exchange control information and packet data information by means of, for example, a shared memory. The first communication processor 212 may transmit and receive various pieces of information, such as sensing information, information about output strength, and resource block (RB) allocation information to and from the second communication processor 214.

Depending on their implementation, the first communication processor 212 may not be coupled directly to the second communication processor 214. In this case, the first communication processor 212 may transmit and receive data to and from the second communication processor 214 through the processor 120 (e.g., an application processor). For example, the first communication processor 212 may transmit and receive data to and from the second communication processor 214 through the processor 120 (e.g., the application processor), an HS-UART interface or a PCIe interface, and a type of an interface is not limited. Alternatively, the first communication processor 212 may exchange control information and packet data information with the second communication processor 214 using the processor 120 (e.g., the application processor) and a shared memory.

According to an embodiment of the disclosure, the first communication processor 212 and the second communication processor 214 may be incorporated in a single chip or a single package. According to various embodiments of the disclosure, the first communication processor 212 or the second communication processor 214 may be incorporated together with the processor 120, an auxiliary processor 123, or a communication module 190 in a single chip or a single package.

Figure 2B:
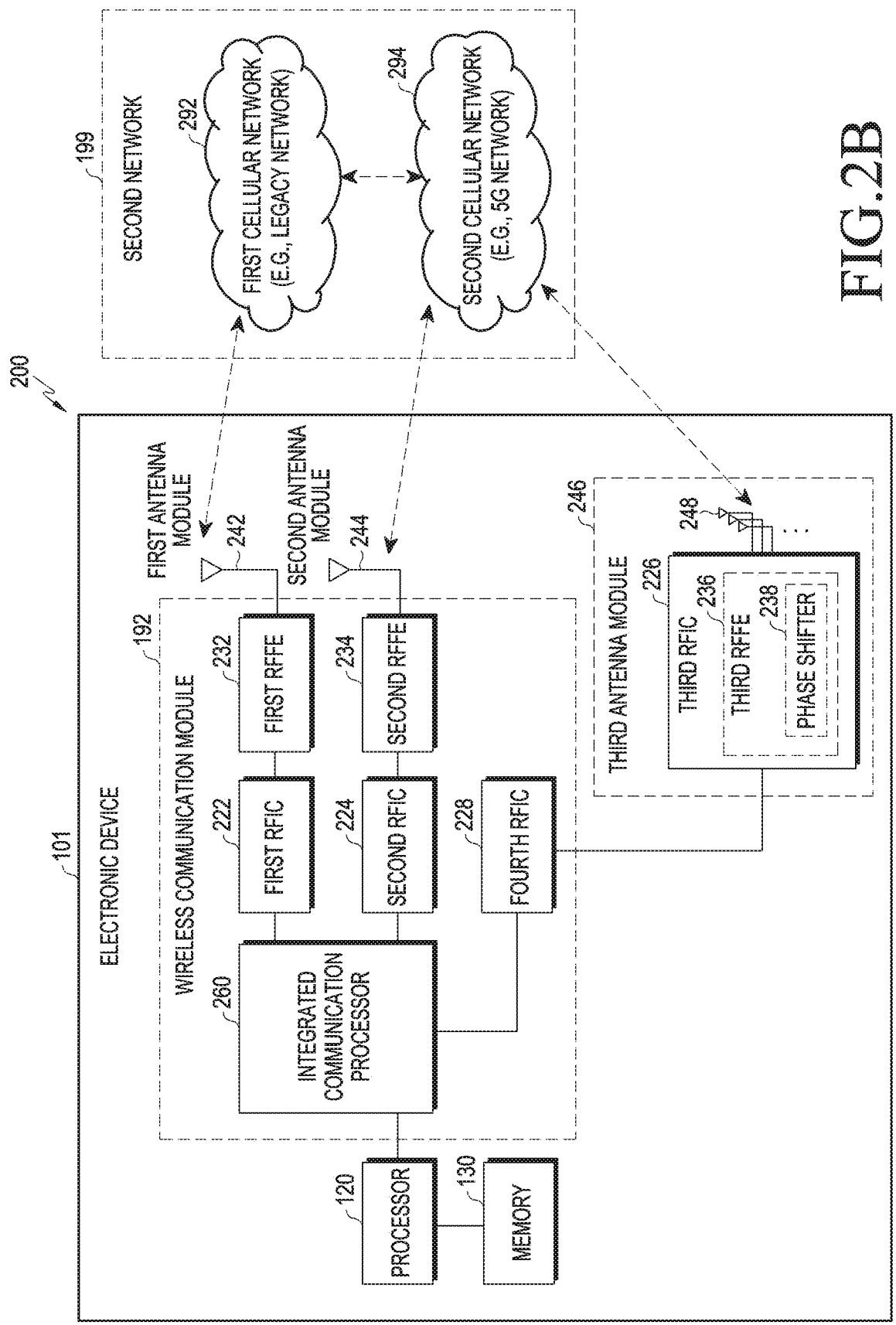
FIG. 2B is a block diagram illustrating an electronic device for supporting a legacy network communication and a 5G network communication according to an embodiment of the disclosure.

FIG. 2B is a block diagram illustrating an electronic device for supporting a legacy network communication and a 5G network communication according to an embodiment of the disclosure.

Referring to FIG. 2B, an integrated communication processor 260 may support all of functions for a communication with the first cellular network 292 and the second cellular network 294.

For transmission, the first RFIC 222 may convert a baseband signal generated by the first communication processor 212 to an RF signal in about 700 megahertz (MHz) to about 3 GHz used in the first cellular network 292 (e.g., the legacy network). For reception, an RF signal may be obtained from the first cellular network 292 (e.g., the legacy network) through an antenna (e.g., the first antenna module 242) and pre-processed through an RFFE (e.g., the first RFFE 232). The first RFIC 222 may convert the pre-processed RF signal to a baseband signal so that the baseband signal may be processed by the first communication processor 212.

For transmission, the second RFIC 224 may convert a baseband signal generated by the first communication processor 212 or the second communication processor 214 to a radio frequency (RF) signal in a Sub6 band (e.g., about 6 GHz or less) used in the second cellular network 294 (e.g., the 5G network). For reception, a 5G Sub6 RF signal may be obtained from the second cellular network 294 (e.g., the 5G network) through an antenna (e.g., the second antenna module 244) and pre-processed in an RFFE (e.g., the second RFFE 234). The second RFIC 224 may convert the pre-processed 5G Sub6 RF signal to a baseband signal so that the baseband signal may be processed by a corresponding one between the first communication processor 212 and the second communication processor 214.

For transmission, the third RFIC 226 may convert a baseband signal generated by the second communication processor 214 to an RF signal (hereinafter, referred to as, a 5G Above6 RF signal) in a 5G Above6 band (e.g., about 6 GHz to about 60 GHz) to be used in the second cellular network 294 (e.g., the 5G network). For reception, a 5G Above6 RF signal may be obtained from the second cellular network 294 (e.g., the 5G network) through an antenna (e.g., the antenna 248) and pre-processed through the third RFFE 236. The third RFIC 226 may convert the pre-processed 5G Above6 RF signal to a baseband signal so that the baseband signal may be processed by the second communication processor 214. According to an embodiment of the disclosure, the third RFFE 236 may be formed as part of the third RFIC 226.

According to an embodiment of the disclosure, the electronic device 101 may include the fourth RFIC 228 separately from or as part of the third RFIC 226. In this case, the fourth RFIC 228 may convert a baseband signal generated by the second communication processor 214 to an RF signal in an intermediate frequency band (e.g., about 9 GHz to about 11 GHz) (hereinafter, referred to as an intermediate frequency (IF) signal), and provide the IF signal to the third RFIC 226. The third RFIC 226 may convert the IF signal to a 5G Above6 RF signal. During reception, a 5G Above6 RF signal may be received from the second cellular network 294 (e.g., the 5G network) through an antenna (e.g., the antenna 248) and converted to an IF signal by the third RFIC 226. The fourth RFIC 228 may convert the IF signal to a baseband signal so that the baseband signal may be processed by the second communication processor 214.

According to an embodiment of the disclosure, the first RFIC 222 and the second RFIC 224 may be implemented as at least part of a single chip or a single package. According to an embodiment of the disclosure, the first RFFE 232 and the second RFFE 234 may be implemented as at least part of a single chip or a single package. According to an embodiment of the disclosure, at least one of the first antenna module 242 or the second antenna module 244 may be omitted or combined with the other antenna module to process RF signals in a plurality of corresponding bands.

According to an embodiment of the disclosure, the third RFIC 226 and the antenna 248 may be arranged on the same substrate to form a third antenna module 246. For example, the wireless communication module 192 or the processor 120 may be arranged on a first substrate (e.g., a main PCB). In this case, the third RFIC 226 may be arranged in a partial area (e.g., the bottom surface) of a second substrate (e.g., a sub PCB) other than the first substrate and the antenna 248 may be arranged in another partial area (e.g., the top surface) of the second substrate, to form the third antenna module 246. As the third RFIC 226 and the antenna 248 are arranged on the same substrate, it is possible to reduce length of a transmission line between the third RFIC 226 and the antenna 248. This may reduce, for example, loss (e.g., attenuation) of a signal in a high frequency band (e.g., about 6 GHz to about 60 GHz) used for a 5G network communication, on the transmission line. Therefore, the electronic device 101 may increase quality or a speed of a communication with the second cellular network 294 (e.g., the 5G network).

According to an embodiment of the disclosure, the antenna 248 may be formed as an antenna array including a plurality of antenna elements which may be used for beamforming. In this case, for example, the third RFIC 226 may include a plurality of phase shifters 238 corresponding to the plurality of antenna elements, as part of the third RFFE 236. During transmission, each of the plurality of phase shifters 238 may change a phase of a 5G Above6 RF signal to be transmitted to the outside of the electronic device 101 (e.g., a base station in the 5G network) through a corresponding antenna element. During reception, each of the phase shifters 238 may change a phase of a 5G Above6 RF signal received from the outside through a corresponding antenna element to the same or substantially same phase. This enables transmission or reception through beamforming between the electronic device 101 and the outside.

The second cellular network 294 (e.g., the 5G network) may be operated independently of the first cellular network 292 (e.g., the legacy network) (e.g., SA (Stand-Alone)) or in connection to the first cellular network 292 (e.g., the legacy network) (e.g., Non-Stand Alone (NSA)). For example, the 5G network may include only an access network (e.g., a 5G radio access network (RAN) or next generation RAN (NG RAN)) without a core network (e.g., a next generation core (NGC)). In this case, after accessing the access network of the 5G network, the electronic device 101 may access an external network (e.g., an Internet) under the control of a core network (e.g., an evolved packet core (EPC)) of the legacy network. Protocol information for a communication with the legacy network (e.g., LTE protocol information) and protocol information for a communication with the 5G network (e.g., New Radio (NR) protocol information) may be stored in the memory 230 and accessed by another component (e.g., the processor 120, the first communication processor 212, or the second communication processor 214).

Figure 3:
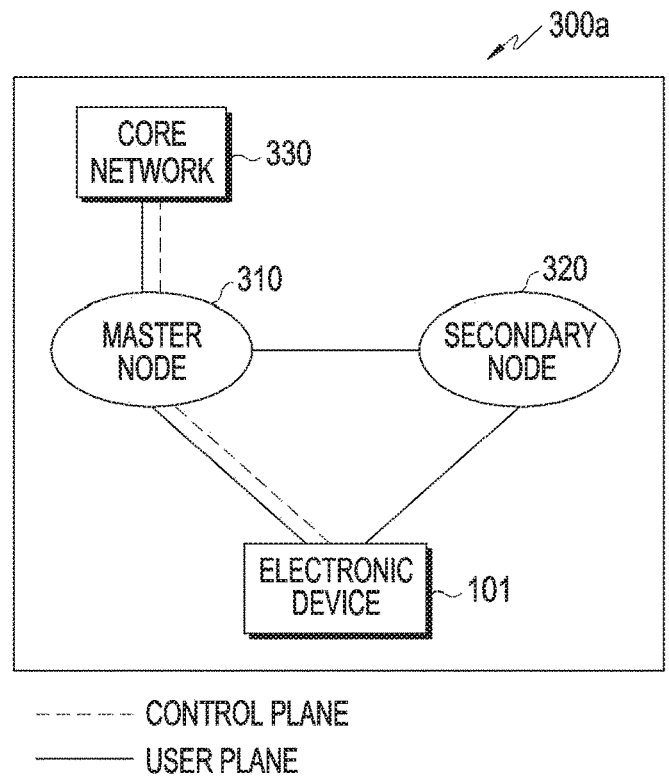
FIG. 3 is a diagram illustrating a wireless communication system which provides a legacy communication network and/or a 5G communication network according to an embodiment of the disclosure.

FIG. 3 is a diagram illustrating a wireless communication system which provides a legacy communication network and/or a 5G communication network according to an embodiment of the disclosure.

Referring to FIG. 3, a network environment 300a may include at least one of a legacy network or a 5G network. The legacy network may include, for example, a 4G or LTE base station (e.g., an eNB or eNodeB) of the 3GPP standard supporting a wireless access of the electronic device 101, and an EPC which manages a 4G communication. The 5G network may include, for example, an NR base station (e.g., gNB or gNodeB) supporting a wireless access of the electronic device 101, and a 5th generation core (5GC) which manages a 5G communication of the electronic device 101.

According to various embodiments of the disclosure, the electronic device 101 may transmit and receive a control message and user data through a legacy communication and/or 5G communication. The control message may include a message related to at least one of, for example, security control, bearer setup, authentication, registration, or mobility management of the electronic device 101. The user data may refer to, for example, user data except for a control message transmitted and received between the electronic device 101 and a core network 330 (e.g., the EPC).

Referring to FIG. 3, the electronic device 101 according to an embodiment may transmit and receive at least one of a control message or user data to and from at least part (e.g., an NR base station and a 5GC) of the 5G network using at least part (e.g., an LTE base station and an EPC) of the legacy network.

According to various embodiments of the disclosure, the network environment 300a may include a network environment which provides wireless communication dual connectivity (DC) to the LTE base station and the NR base station and transmits and receives a control message to and from the electronic device 101 through one core network 230 of the EPC or the 5GC 352.

According to various embodiments of the disclosure, in a DC environment, one of the LTE base station and the NR base station may operate as a master node (MN) 310 and the other may operate as a secondary node (SN) 320. The MN 310 may be connected to the core network 230 and transmit and receive a control message to and from the core network 230. The MN 310 and the SN 320 may be connected to each other through a network interface and transmit and receive a message related to management of a wireless resource (e.g., a communication channel) to and from each other.

According to various embodiments of the disclosure, the MN 310 may include the LTE base station, the SN 320 may include the NR base station, and the core network 330 may include the EPC. For example, a control message may be transmitted and received through the LTE base station and the EPC, and user data may be transmitted through at least one of the LTE base station or the NR base station.

According to various embodiments of the disclosure, the MN 310 may include the NR base station, the SN 320 may include the LTE base station, and the core network 330 may include the 5GC. For example, a control message may be transmitted and received through the NR base station and the 5GC, and user data may be transmitted through at least one of the LTE base station or the NR base station.

According to various embodiments of the disclosure, the electronic device 101 may be registered in at least one of the EPC or the 5GC, and transmit and receive a control message.

According to various embodiments of the disclosure, the EPC and the 5GC may interwork and manage a communication of the electronic device 101.

As described above, dual connectivity through an LTE base station and an NR base station may be referred to as E-UTRA new radio dual connectivity (EN-DC). Meanwhile, multi-radio access technology (RAT) (MR) DC may be variously applied in addition to EN-DC. For example, a first network and a second network by the MR DC are all related to an LTE communication, and the second network may be a network which corresponds to a small-cell of a specific frequency. For example, the first network and the second network by the MR DC are all related to 5G, the first network may correspond to a frequency band below 6 GHz (e.g., below 6), and the second network may correspond to a frequency band of 6 GHz or above (e.g., over 6). In addition to the above-described examples, those skilled in the art will readily understand that a network structure may be applied to various embodiments of the disclosure as long as dual connectivity may be applied to the network structure.

Figure 4:
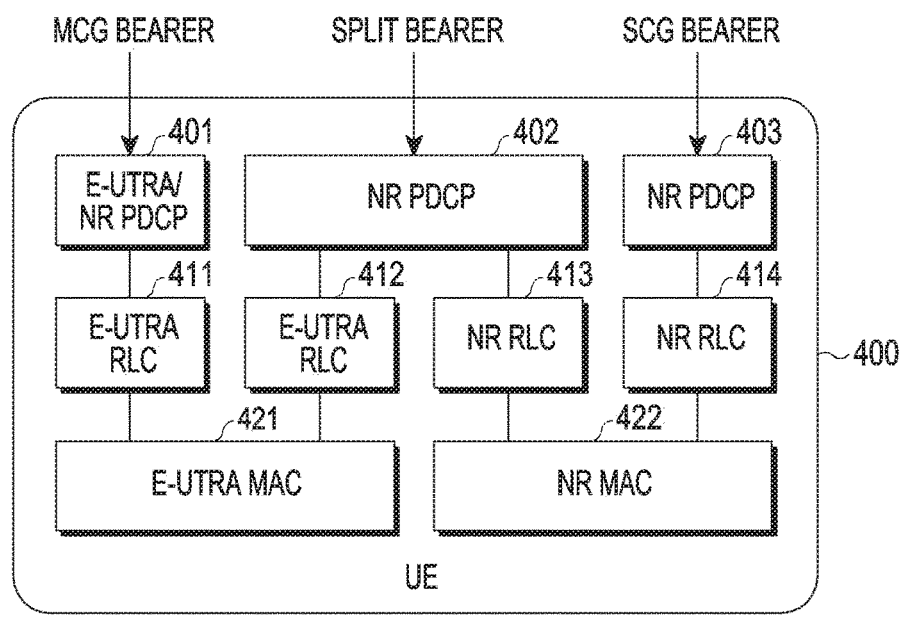
FIG. 4 illustrates a diagram illustrating a bearer at a user equipment (UE) according to an embodiment of the disclosure.

FIG. 4 illustrates a diagram illustrating a bearer at a UE according to an embodiment of the disclosure.

Referring to FIG. 4, bearers available in a 5G non-standalone network environment (e.g., a network environment 300a in FIG. 3) may include a master cell group (MCG) bearer, a secondary cell group (SCG) bearer, and a split bearer. An E-UTRA/NR packet data convergence protocol (PDCP) entity 401 and NR PDCP entities 402 and 403 may be configured to n user equipment (UE) 400. An E-UTRA radio link control (RLC) entities 411 and 412 and NR RLC entities 413 and 414 may be configured to the UE 400. An E-UTRA medium access control (MAC) entity 421 and an NR MAC entity 422 may be configured to the UE 400. A UE may refer to a user device capable of communicating with a base station and may be interchangeably used with the electronic device 101 of FIG. 1. For example, in various embodiments of the disclosure, when it is said that the UE performs a specific operation, this may imply that at least one component included in the electronic device 101 performs the specific operation.

An MCG may correspond to, for example, an MN 310 in FIG. 3, and an SCG may correspond to, for example, an SN 320 in FIG. 3. Once a node to perform a communication is determined, the UE 400 may configure various entities illustrated in FIG. 4 to communicate with the determined node (e.g., a base station). The entities 401, 402 and 403 of a PDCP layer may receive data (e.g., a PDCP service data unit (SDU) corresponding to an internet protocol (IP) packet) and output converted data (e.g., a PDCP protocol data unit (PDU)) in which additional information (e.g., header information) is reflected. The entities 411, 412, 413, and 414 of an RLC layer may receive the converted data (e.g., the PDCP PDU) output from the entities 401, 402 and 403 of the PDCP layer and output converted data (e.g., an RLC PDU) in which additional information (e.g., header information) is reflected. The entities 421 and 422 of a MAC layer may receive the converted data (e.g., the RLC PDU) output from the entities 411, 412, 413, and 414 of the RLC layer and output converted data (e.g., a MAC PDU) in which additional information (e.g., header information) is reflected to a physical layer (not shown).

In dual connectivity (DC), an MCG bearer may be associated with a path (or data) in which data may be transmitted and received only using a resource or an entity which corresponds to an MN. In the dual connectivity, an SCG bearer may be associated with a path (or data) in which data may be transmitted and received only using a resource or an entity which corresponds to an SN. In the dual connectivity, a split bearer may be associated with a path (or data) in which data may be transmitted and received using the resource or the entity which corresponds to the MN or the resource or the entity which corresponds to the SN. Accordingly, as illustrated in FIG. 4, the split bearer may be associated with all of the E-UTRA RLC entity 412, the NR RLC entity 413, the E-UTRA MAC entity 421, and the NR MAC entity 422 through the NR PDCP entity 402.

In the following description, EN-DC is described as a specific dual connectivity, but the disclosure is not limited to EN-DC described later, and may be applied to various types of dual connectivity.

Figure 5:
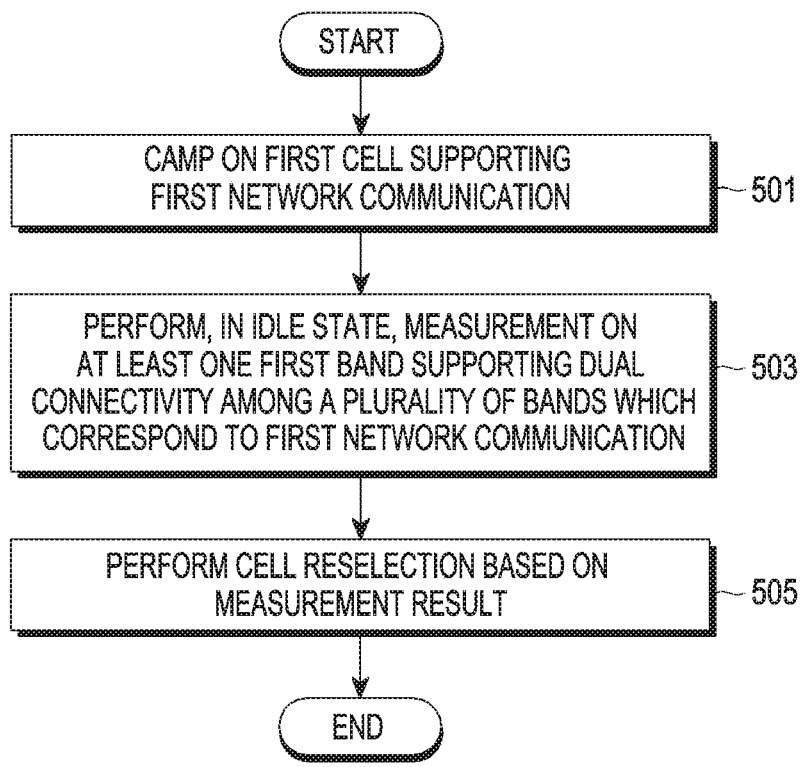
FIG. 5 illustrates a flowchart illustrating an operating method of an electronic device according to an embodiment of the disclosure.

FIG. 5 illustrates a flowchart illustrating an operating method of an electronic device according to an embodiment of the disclosure. An embodiment of FIG. 5 will be described with reference to FIG. 6.

Figure 6:
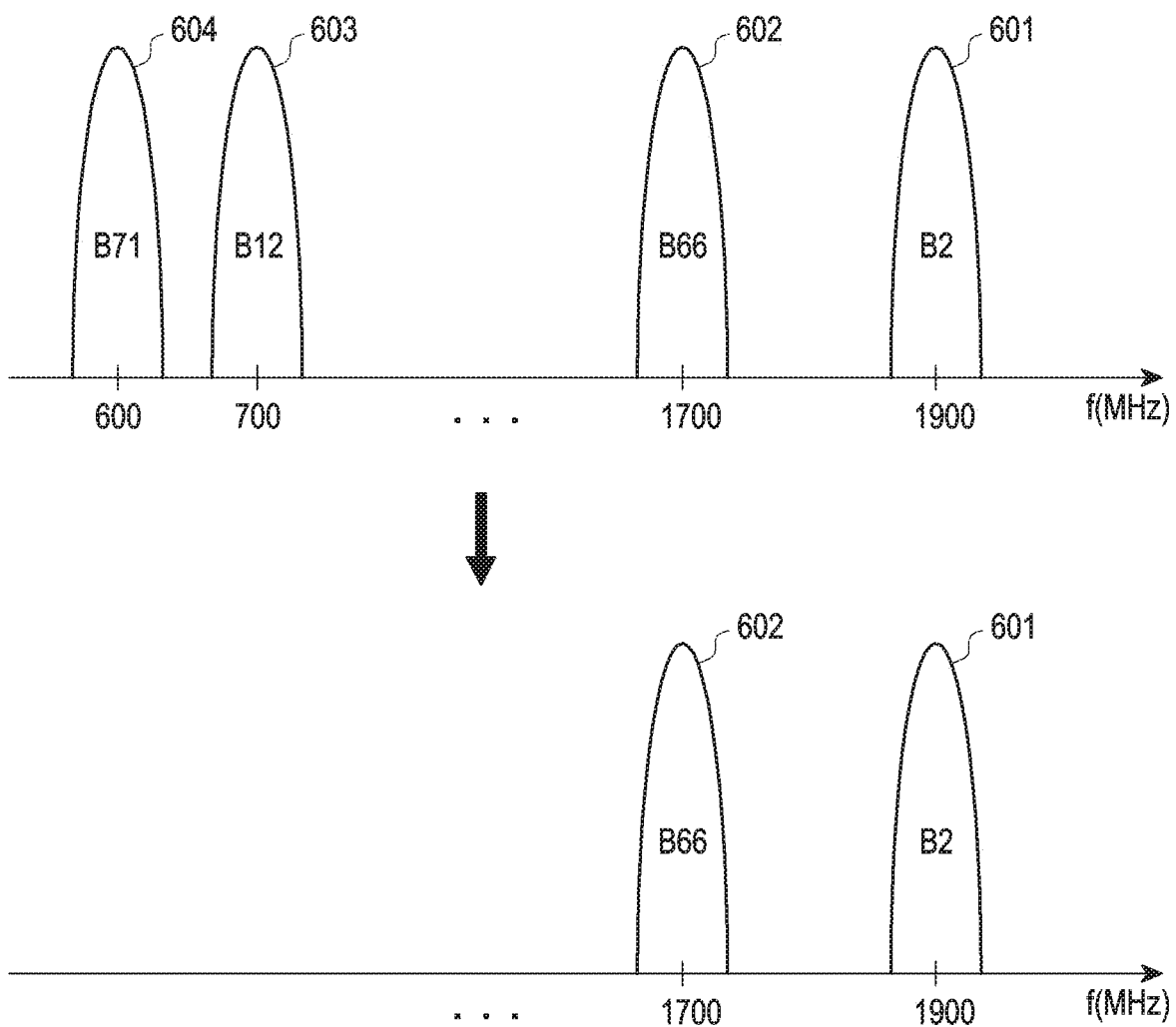
FIG. 6 illustrates a diagram illustrating an operation of an electronic device according to an embodiment of the disclosure.

FIG. 6 illustrates a diagram illustrating an operation of an electronic device according to an embodiment of the disclosure.

Referring to FIG. 5, according to various embodiments of the disclosure, an electronic device 101 (e.g., at least one of a first communication processor 212, a second communication processor 214, or an integrated communication processor 260) may camp on a first cell which supports a first network communication in operation 501. For example, if the electronic device 101 is turned on, a public land mobile network (PLMN) may be selected, for example, by a non-access stratum (NAS). The PLMN may be selected automatically or manually, and there is no limitation to a selection scheme. The electronic device 101 may search for a suitable cell in the selected PLMN. The suitable cell may be a cell on which the electronic device 101 may camp. For a criterion for the suitable cell, reference may be made to, for example, 3GPP TS 36.304 or 3GPP TS 38.304. The electronic device 101 may perform a search for each frequency and select the suitable cell based on the search result. If the suitable cell is not searched in at least one selected PLMN, the electronic device 101 may camp on any cell which belongs to any PLMN. For initial selection for the first cell, for example, according to 3GPP TS 36.304 or 3GPP TS 38.304, a cell selection RX level value (hereinafter, referred to as Srxlev) may be greater than 0 and a cell selection quality value (hereinafter, referred to as Squal) may be greater than 0, however there is no limitation to an initial selection process. The electronic device 101 may camp on the first cell based on the search result. According to various embodiments of the disclosure, "camp on" may include an operation of selecting a cell capable of providing an available service and monitoring at least one of a control channel or system information of the cell. According to various embodiments of the disclosure, the cell on which the electronic device 101 camps may be referred to as a serving cell. The electronic device 101 may support a plurality of network communications (e.g., an LTE communication and an NR communication). In operation 501, the electronic device 101 may camp on the first cell based on, for example, a first network communication (e.g., the LTE communication).

According to various embodiments of the disclosure, in operation 503, the electronic device 101, in an idle state (e.g., an RRC_IDLE state and/or an RRC_INACTIVE state), may perform a measurement on at least one first band which supports dual connectivity among a plurality of bands which correspond to the first network communication. The electronic device 101 may previously store information about a band which supports the dual connectivity among the plurality of bands in a memory (e.g., a memory 130 and/or a communication processor-dedicated memory).

For example, referring to FIG. 6, a B2 band 601 and a B66 band 602 among bands including the B2 band 601, the B66 band 602, a B12 band 603, and a B71 band 604 for an LTE communication may support the dual connectivity (e.g., EN-DC). This may mean that frequency bands used by a base station supporting the dual connectivity are the B2 band 601 and the B66 band 602. For example, an LTE communication may be set to perform transmission and reception of a control signal in the EN-DC. A band used by a cell supporting the dual connectivity among bands of a network communication which corresponds to a control plane may be referred to as an anchor band. The anchor band may denote a band in which an MN cell for the dual connectivity is operable. In addition, a band used by a cell which does not support the dual connectivity among the bands of the network communication may be referred to as a non-anchor band. In an embodiment in FIG. 6, the B2 band 601 and the B66 band 602 may be anchor bands, and the B12 band 603 and the B71 band 604 may be non-anchor bands. The electronic device 101 may store information about the band which supports the dual connectivity and the band which does not support the dual connectivity in the memory (e.g., the memory 130 and/or the communication processor-dedicated memory). Information related to the band which supports the dual connectivity may be determined based on at least one of a communication provider, a manufacturer, or a standard, and may be stored in the memory of the electronic device 101 (e.g., the memory 130 and/or the communication processor-dedicated memory). The information stored in the memory (e.g., the memory 130 and/or the communication processor-dedicated memory) may be stored at the time of manufacture, but may be updated later, and updated information may be received from the outside. Alternatively, the information stored in the memory (e.g., the memory 130 and/or the communication processor-dedicated memory) may be received from the outside when the electronic device 101 is opened and may be stored therein.

According to various embodiments of the disclosure, the electronic device 101 may store information about a band (or a frequency) supported by the electronic device 101, and the information about the band (or the frequency) supported by the electronic device 101 may be referred to as a capability. For example, if bands supported by the electronic device 101 are the B2 band 601, the B66 band 602, the B12 band 603, and the B71 band 604 in FIG. 6, a capability of the electronic device 101 may be the B2 band 601, the B66 band 602, the B12 band 603, and the B71 band 604. Meanwhile, as will be described later, the electronic device 101 may be configured to change the capability. For example, the electronic device 101 may set the capability including bands supporting the dual connectivity (e.g., the B2 band 601 and the B66 band 602) among the bands supported by the electronic device 101. Here, the setting of the capability may mean that a measurement target band is determined corresponding to the set capability. The electronic device 101 may report, for example, the stored capability to a serving cell, and information about the stored capability may be included in a UE capability field within a reported message.

According to various embodiments of the disclosure, if information 640 associated with the band supporting the dual connectivity is not separately defined by a communication provider or a manufacturer, the information 640 may follow 3GPP standard (e.g., 3GPP TS 38.101) information. According to various embodiments of the disclosure, the information associated with the band supporting the dual connectivity may be defined in the 3GPP standard as shown in Tables 1 and 2.

TABLE 1

| EN-DC band | E-UTRA Band | NR Band |
|---|---|---|
| DC_(n)71 | 71 | n71 |
| DC_3_n3 | 3 | n3 |
| DC_1_n28 | 1 | n28 |
| DC_1_n40 | 1 | n40 |
| ... | | |
| DC_42_n77[5] | 42 | n77 |
| DC_42_n78[5] | 42 | n78 |
| ... | | |
| DC_1_n257 | 1 | n257 |
| DC_2-2_n257 | CA_2-2 | n257 |

TABLE 1-continued

| EN-DC band | E-UTRA Band | NR Band |
|---|---|---|
| DC_2_n257 | CA_2 | n257 |
| DC_2_n260 | 2 | n260 |
| ... | | |
| DC_1-3_n257[1] | CA_1-3 | n257 |
| DC_1-5_n257[1] | CA_1-5 | n257 |

TABLE 2

| NR-DC Band | NR Band |
|---|---|
| DC_n77-n257 | n77, n257 |
| DC_n78-n257 | n78, n257 |
| DC_n79-n257 | n79, n257 |

According to various embodiments of the disclosure, the electronic device 101 may perform a measurement on at least one first band (e.g., the B2 band 601 and the B66 band 602 in FIG. 6) supporting the dual connectivity. The electronic device 101 may not perform a measurement on the band which does not support the dual connectivity (e.g., the B12 band 603 and the B71 band 604 in FIG. 6). For example, the electronic device 101 may not perform the measurement on the band which does not support the dual connectivity (e.g., the B12 band 603 and the B71 band 604 in FIG. 6), or may perform the measurement on the band which does not support the dual connectivity (e.g., the B12 band 603 and the B71 band 604 in FIG. 6) up to a certain number of times. Here, measurement for a band may mean measurement for at least one of reference signal received power (RSRP), reference signal received quality (RSRQ), a received signal strength indicator (RSSI), or a signal to noise ratio (SNR) of a communication signal from any cell in a frequency included in the band. A measurement rule may be defined in, for example, 3GPP TS36.304 or 3GPP TS38.304, but is not limited thereto. The measurement for the band (or a frequency) may be referred to as measurement for a serving cell or a neighbor cell, and in some cases, may be referred to as a search for a suitable cell (or a more suitable cell). For example, at least one frequency may be included in an inter frequency carrier frequency and/or an intra frequency carrier frequency included in an SIB received from the serving cell. The electronic device may be configured to perform a measurement on a frequency which corresponds to a band supporting the dual connectivity among the at least one frequency, and not to perform a measurement on a frequency which corresponds to a band which does not support the dual connectivity.

It will be understood by those skilled in the art that, in various embodiments of the disclosure, a fact that the electronic device 101 performs a specific operation on an arbitrary band may be understood as a fact that the electronic device 101 performs a specific operation on a frequency included in the arbitrary band. The electronic device 101 may perform a measurement on all of at least one first band, but may also perform a measurement on at least some of the at least one first band. In this document, a fact that the electronic device 101 performs a measurement on at least one band may mean a fact that the electronic device 101 performs a measurement on all or some of the at least one band.

According to various embodiments of the disclosure, in operation 505, the electronic device 101 may perform a cell reselection based on a measurement result. In operation 503, because the electronic device 101 performs a measurement on the band supporting the dual connectivity, the electronic device 101 may select a suitable cell (or a more suitable cell) among cells which correspond to the band supporting the dual connectivity. Accordingly, a possibility that the electronic device 101 camps on a cell supporting the dual connectivity may increase, and a possibility that the electronic device 101 camps on a cell which does not support the dual connectivity may decrease. For example, if the electronic device 101 performs a measurement on the bands 601, 602, 603, and 604, and performs a cell reselection based on a measurement result, as shown in FIG. 6, there is a possibility that the electronic device 101 camps on a cell (e.g., a cell using non-anchor bands 603 and 604) which does not support the dual connectivity. If the electronic device 101 performs a measurement on bands (e.g., anchor bands 601 and 602) supporting the dual connectivity and performs a cell reselection based on a measurement result, there is a possibility that the electronic device 101 camps on a cell (e.g., a cell using the anchor bands 601 and 602) supporting the dual connectivity.

Figure 7:
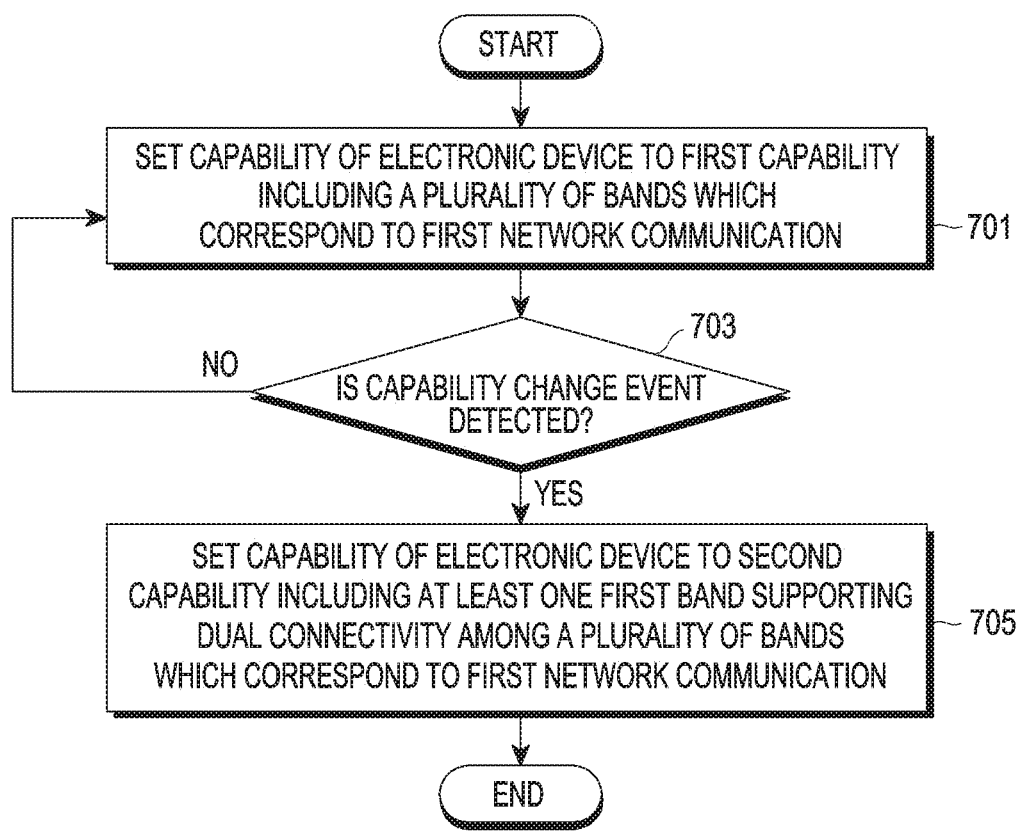
FIG. 7 is a flowchart illustrating an operating method of an electronic device according to an embodiment of the disclosure.

FIG. 7 is a flowchart illustrating an operating method of an electronic device according to an embodiment of the disclosure.

Referring to FIG. 7, according to various embodiments of the disclosure, an electronic device 101 (e.g., at least one of a first communication processor 212, a second communication processor 214, or an integrated communication processor 260) may set a capability of the electronic device 101 to a first capability including a plurality of bands which correspond to a first network communication in operation 701. As described above, a capability may be understood as information about a band (or a frequency) supported by the electronic device 101. The first capability may indicate, for example, all bands supported by the electronic device 101 which are stored in advance. The electronic device 101 may set the capability of the electronic device 101 as the first capability. The electronic device 101 may report information about the capability (e.g., information about the first capability), for example, a UE capability (e.g., a supported E-UTRA band list) to a base station (e.g., an eNB). An entire band supported by the electronic device 101 may be stored, for example, at the time of manufacture, or updated later. For example, referring to FIG. 6, the electronic device 101 may store all information about a band supporting bands 601, 602, 603, and 604 as the first capability.

According to various embodiments of the disclosure, in operation 703, the electronic device 101 may identify whether a capability change event is detected. For example, the capability change event may include identification that a currently camped-on serving cell supports dual connectivity. For example, the capability change event may include identification that a measurement result for the serving cell satisfies a designated condition. Here, the designated condition may include, for example, a condition that RSRP and/or a signal to noise ratio (SNR) is greater than a designated threshold value, but is not limited thereto. A type of the capability change event is not limited, and for example, if a measurement for a cell reselection is started, the electronic device 101 may change the capability without a special condition.

According to various embodiments of the disclosure, if the capability change event is detected (703—yes), the electronic device 101 may set the capability of the electronic device 101 to a second capability including at least one first band supporting the dual connectivity among the plurality of bands which correspond to the first network communication in operation 705. If the capability change event is not detected (703—no), the electronic device 101 may maintain the capability of the electronic device 101 as the first capability. For example, as shown in FIG. 6, the electronic device 101 may set the capability of the electronic device 101 as the second capability which is set to a band which supports a band (e.g., anchor bands 601 and 602) set for the dual connectivity. According to the change in the capability, the band supported by the electronic device 101 may be changed to the band supporting the dual connectivity. The electronic device 101 may perform a measurement on the supported band and perform a cell reselection based on a measurement result. Because all supported bands are bands supporting the dual connectivity, a possibility that the electronic device 101 camps on a cell supporting the dual connectivity may increase.

Although not shown in FIG. 7, according to various embodiments of the disclosure, the capability of the electronic device 101 may return to the first capability from the second capability that the band supporting the dual connectivity is set as the supported band. After returning to the first capability, the electronic device 101 may also perform a measurement on at least some of non-anchor bands. An example in which the electronic device 101 returns to the first capability that the anchor band and the non-anchor band coexist will be described later.

As described above, the electronic device 101 may be configured to change the band supported by the electronic device 101, i.e., the capability, as shown in FIG. 7. Alternatively, the electronic device 101 may be configured to limit a band of a measurement target (or a search target) to a band supporting the dual capability while maintaining the capability. Measurement for a band supporting the dual capability in operation 503 in FIG. 5 may be performed by one of a scheme of changing a capability or a scheme of limiting a measurement target band as described above, and there is no limitation thereto. In addition, those skilled in the art will understand that an operation of changing (or newly setting) a capability in various embodiments of the disclosure may be replaced with an operation of changing a measurement target band while maintaining the capability.

According to various embodiments of the disclosure, in an idle state, the electronic device 101 may be configured not to immediately report a capability change state (or whether the non-anchor band is deactivated) to a network after changing the capability. The electronic device 101 may transmit a tracking area update (TAU) request for a capability change if a connection to the network is required due to a request from an upper layer, such as background data. The capability change state may be used in a handover process in the network (e.g., a cell), and embodiments thereof will be described later in more detail.

Figure 8A:
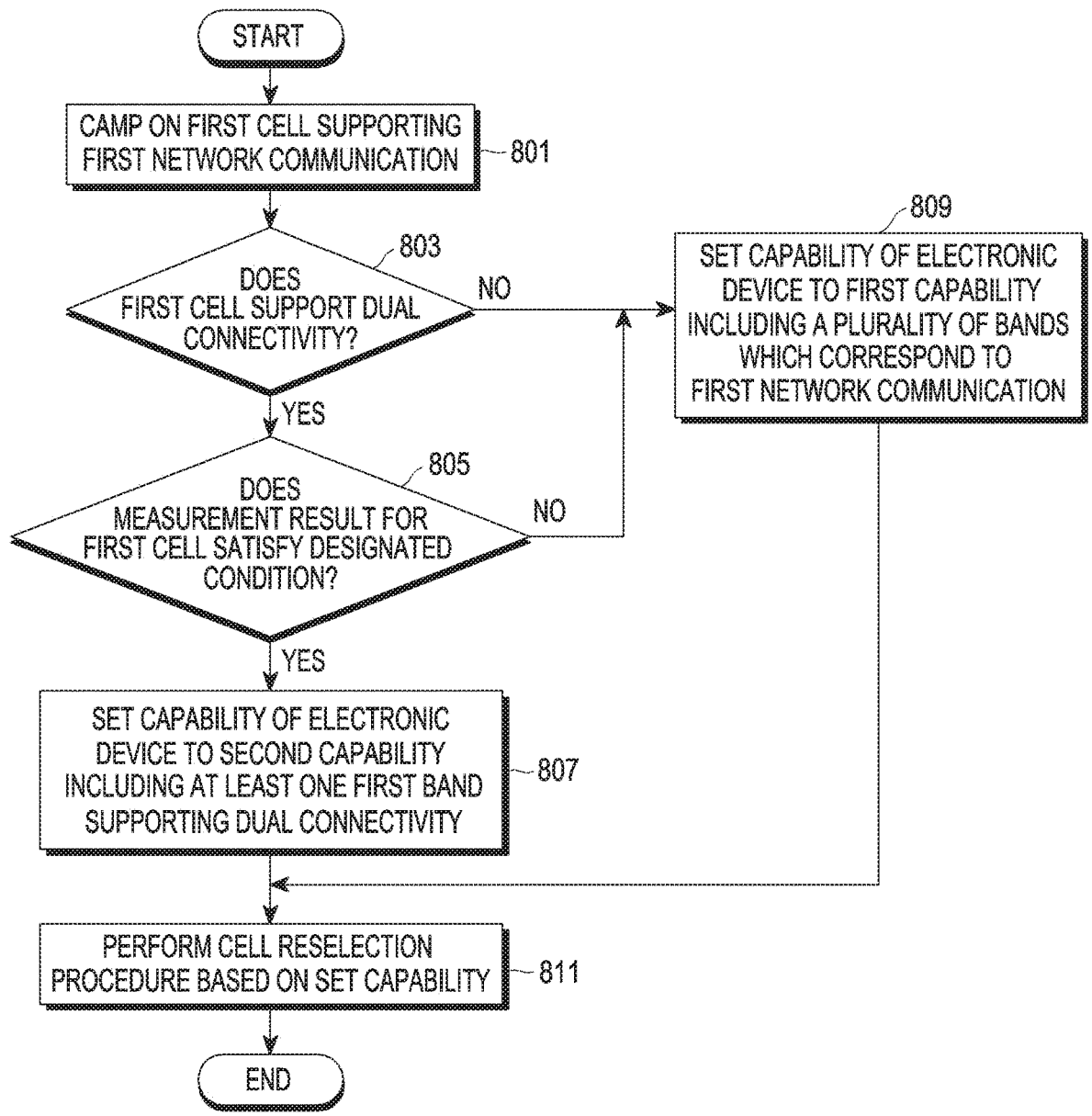
FIG. 8A is a flowchart illustrating an operating method of an electronic device according to an embodiment of the disclosure.

FIG. 8A is a flowchart illustrating an operating method of an electronic device according to an embodiment of the disclosure. Operations which have been described already among operations in FIG. 8A will be described briefly.

Referring to FIG. 8A, according to various embodiments of the disclosure, an electronic device 101 (e.g., at least one of a first communication processor 212, a second communication processor 214, or an integrated communication processor 260) may camp on a first cell which supports a first network communication in operation 801. In operation 803, the electronic device 101 may identify whether the first cell supports dual connectivity. The electronic device 101 may receive at least one system information block (SIB) from the camped-on first cell. For example, if upperlayer-indication-r15 in the SIB2 is set to true, this may mean that a network may support the dual connectivity. For example, the electronic device 101 may identify whether a RestrictDCNR value is false among information included in an Attach Accept message received from a serving cell. For example, if the RestrictDCNR value among the information included in the Attach Accept message is false, this may mean that the network may support the dual connectivity. For example, in a case of EN-DC, if an LTE cell transmits an SIB2 including upperlayerindication-r15 whose value is true, this may indicate that an NR cell exists together with the LTE cell. In some cases, the upperlayerindication-r15 may be referred to as an NR indicator. The electronic device 101 may identify whether the first cell supports the dual connectivity by identifying the upperlayerindication-r15 in the SIB2. There is no limitation to a manner in which the electronic device 101 identifies whether the first cell supports the dual connectivity.

According to various embodiments of the disclosure, if it is identified that the first cell supports the dual connectivity (803—yes), the electronic device 101 may identify whether a measurement result for the first cell satisfies a designated condition in operation 805. Equation 1 is an example of the designated condition.

$$RSRP > Thershold + Hysteresis \qquad \text{Equation 1}$$

In Equation 1, RSRP is RSRP of a communication signal from the first cell, Threshold is a threshold value, and Hysteresis may be a value for a hysteresis operation. The value for the hysteresis operation may be a positive or negative value, but may be zero (0) in some cases. According to an embodiment of the disclosure, if the value for the hysteresis operation is 0, the hysteresis operation may not be performed. The threshold value and the value for the hysteresis operation may be stored, for example, in the electronic device 101 in advance, but may be received from the outside in various examples. A limitation to a search for a non-anchor band may be referred to as deactivation for the non-anchor band, and release from the limitation to the search for the non-anchor band may be referred to as activation for the non-anchor band. By applying the value for the hysteresis operation to the threshold value, frequent activation/deactivation switching for the non-anchor band may be prevented. In Equation 1, the RSRP may be changed to various measurement results, such as an SNR, RSSI, or RSRQ, and may be changed to a condition which is based on two or more measurement results. The designated condition is not limited as long as a condition indicating that a communication which corresponds to the serving cell is good. To prevent the frequent activation/deactivation switching for the non-anchor band, the electronic device 101 may be configured to perform operation 807 after expiration of time (TimeTotrigger) set for a trigger, even if the designated condition is satisfied in operation 805.

According to various embodiments of the disclosure, if it is identified that the measurement result for the first cell satisfies the designated condition (805—yes), the electronic device 101 may set a capability of the electronic device 101 to a second capability including at least one first band supporting the dual connectivity in operation 807. For example, a fact that the electronic device 101 sets the capability of the electronic device 101 to the second capability may mean a fact that the electronic device 101 deactivates the non-anchor band. Accordingly, the electronic device 101 may perform a measurement on at least some of the anchor band. If the serving cell supports the dual connectivity, the non-anchor band may be deactivated so that the electronic device 101 does not camp on a cell which does not support the dual connectivity.

According to various embodiments of the disclosure, if the first cell does not support the dual connectivity in operation 803 (803—no), or if the measurement result for the first cell does not satisfy the designated condition in operation 805 (805—no), the electronic device 101 may set the capability of the electronic device 101 to a first capability including a plurality of bands which correspond to the first network communication in operation 809. The electronic device 101 may perform a measurement on the anchor band and the non-anchor band. As an electric field is deteriorated even if the serving cell uses the anchor-band, the electronic device 101 may activate all supported bands and perform a measurement on at least some of the activated bands. In operation 811, the electronic device 101 may perform a cell reselection procedure based on the set capability.

Figure 8B:
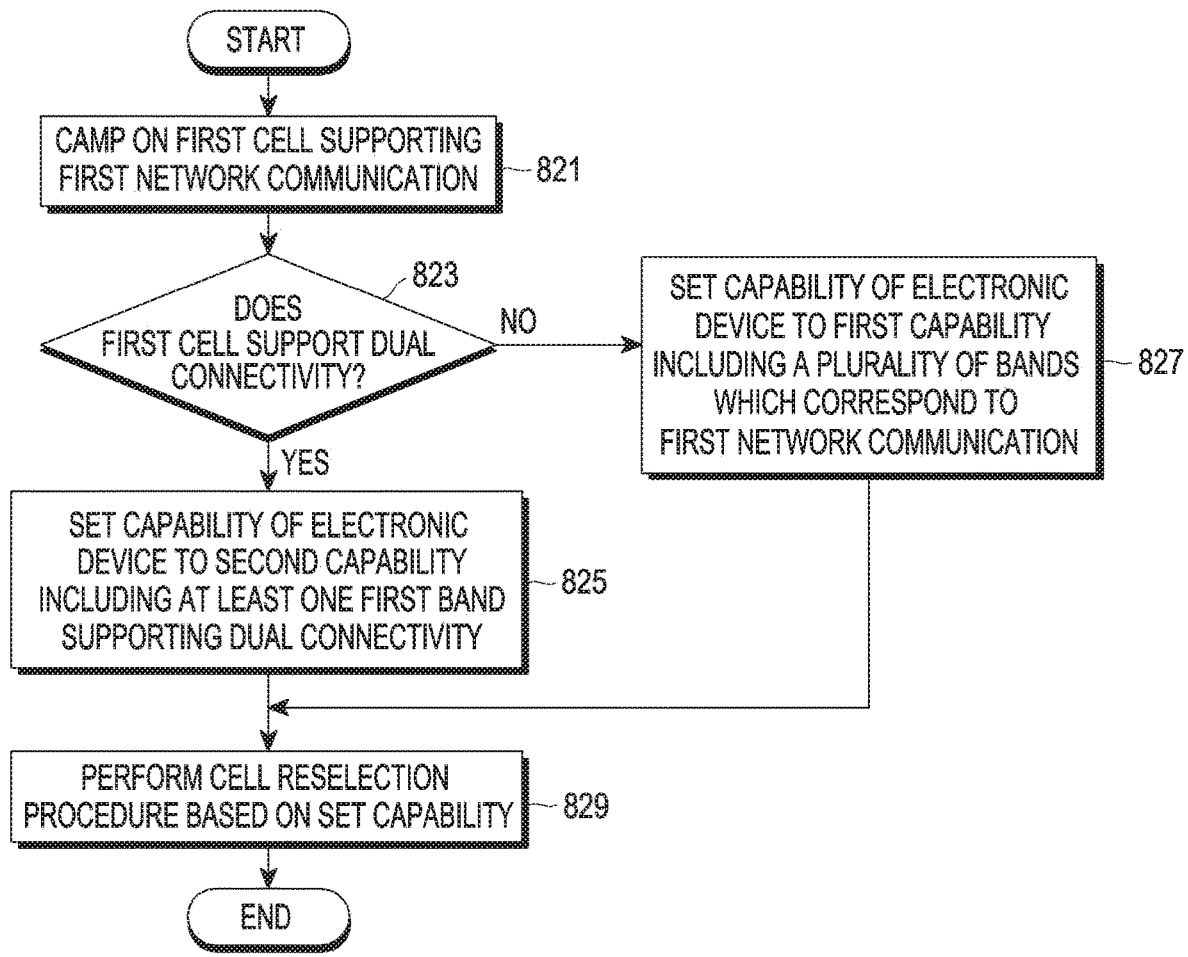
FIG. 8B is a flowchart illustrating an operating method an electronic device according to an embodiment of the disclosure.

FIG. 8B is a flowchart illustrating an operating method of an electronic device according to an embodiment of the disclosure. Operations which have been described already among operations in FIG. 8B will be described briefly.

Referring to FIG. 8B, according to various embodiments of the disclosure, an electronic device 101 (e.g., at least one of a first communication processor 212, a second communication processor 214, or an integrated communication processor 260) may camp on a first cell which supports a first network communication in operation 821. In operation 823, the electronic device 101 may identify whether the first cell supports dual connectivity. For example, the electronic device 101 may identify whether upperlayerindication-r15 among SIB2 information received from a serving cell is true. For example, the electronic device 101 may identify whether a RestrictDCNR value is false among information included in an Attach Accept message received from the serving cell. If the first cell supports the dual connectivity (823—yes), the electronic device 101 may set a capability of the electronic device 101 to a second capability including at least one first band supporting the dual connectivity in operation 825. For example, the electronic device 101 may deactivate a non-anchor band. If the first cell does not support the dual connectivity (823—no), the electronic device 101 may set the capability of the electronic device 101 to a first capability including a plurality of bands which correspond to the first network communication in operation 827. For example, the electronic device 101 may activate all supported bands. In operation 829, the electronic device 101 may perform a cell reselection procedure based on the set capability.

Figure 8C:
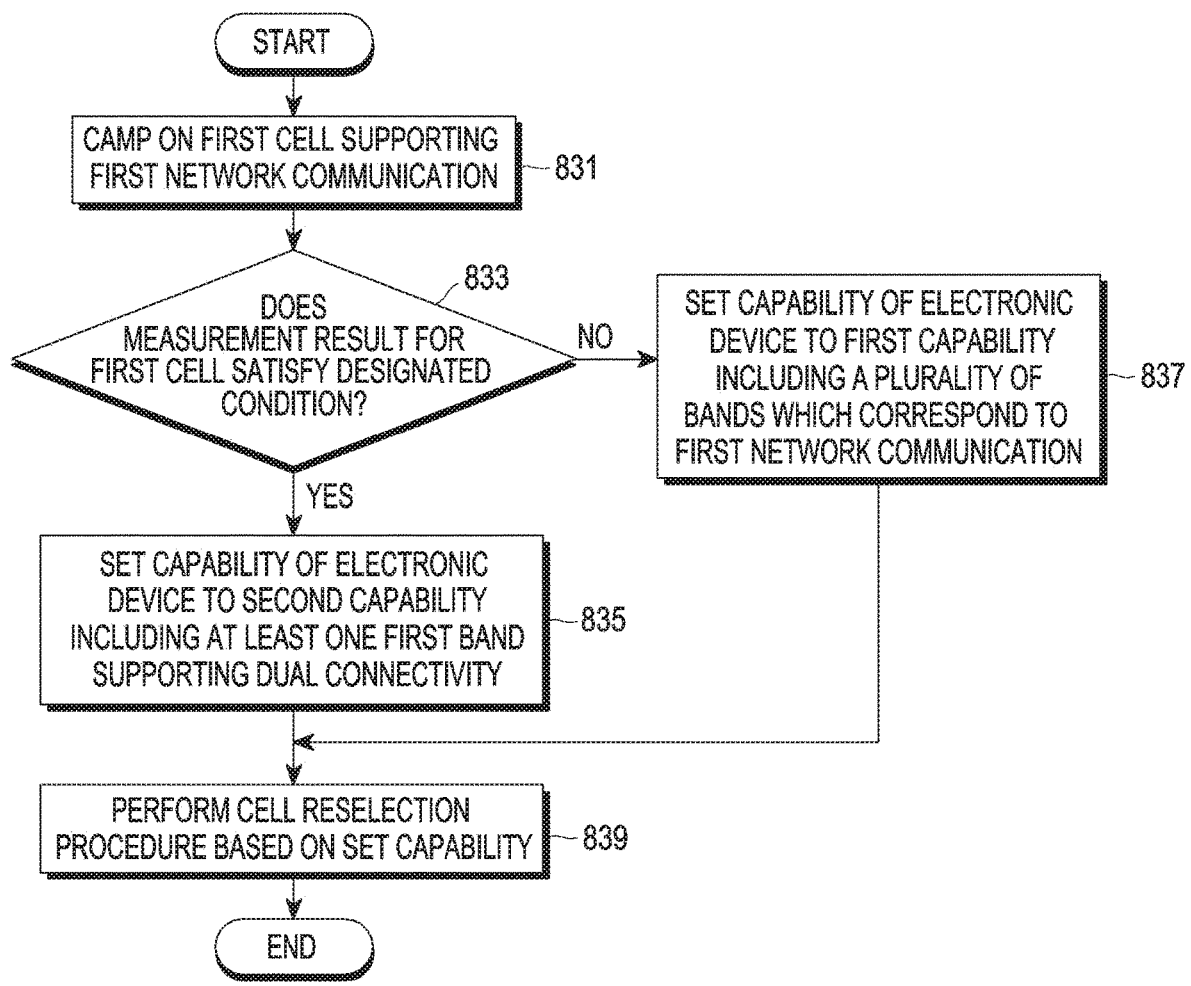
FIG. 8C is a flowchart illustrating an operating method of an electronic device according to an embodiment of the disclosure.

FIG. 8C is a flowchart illustrating an operating method of an electronic device according to an embodiment of the disclosure. Operations which have been described already among operations in FIG. 8C will be described briefly.

Referring to FIG. 8C, according to various embodiments of the disclosure, an electronic device 101 (e.g., at least one of a first communication processor 212, a second communication processor 214, or an integrated communication processor 260) may camp on a first cell which supports a first network communication in operation 831. In operation 833, the electronic device 101 may identify whether a measurement result for the first cell satisfies a designated condition. For example, the electronic device 101 may identify whether a measurement result for a serving cell satisfies a condition in Equation 1, but there is no limitation to the designated condition as described above. If it is identified that the designated condition is satisfied (833—yes), the electronic device 101 may set a capability of the electronic device 101 to a second capability including at least one first band supporting the dual connectivity in operation 835. For example, the electronic device 101 may deactivate a non-anchor band. If it is identified that the designated condition is not satisfied (833—no), the electronic device 101 may set the capability of the electronic device 101 to a first capability including a plurality of bands which correspond to the first network communication in operation 837. For example, the electronic device 101 may activate all supported bands. In operation 839, the electronic device 101 may perform a cell reselection procedure based on the set capability.

Figure 9:
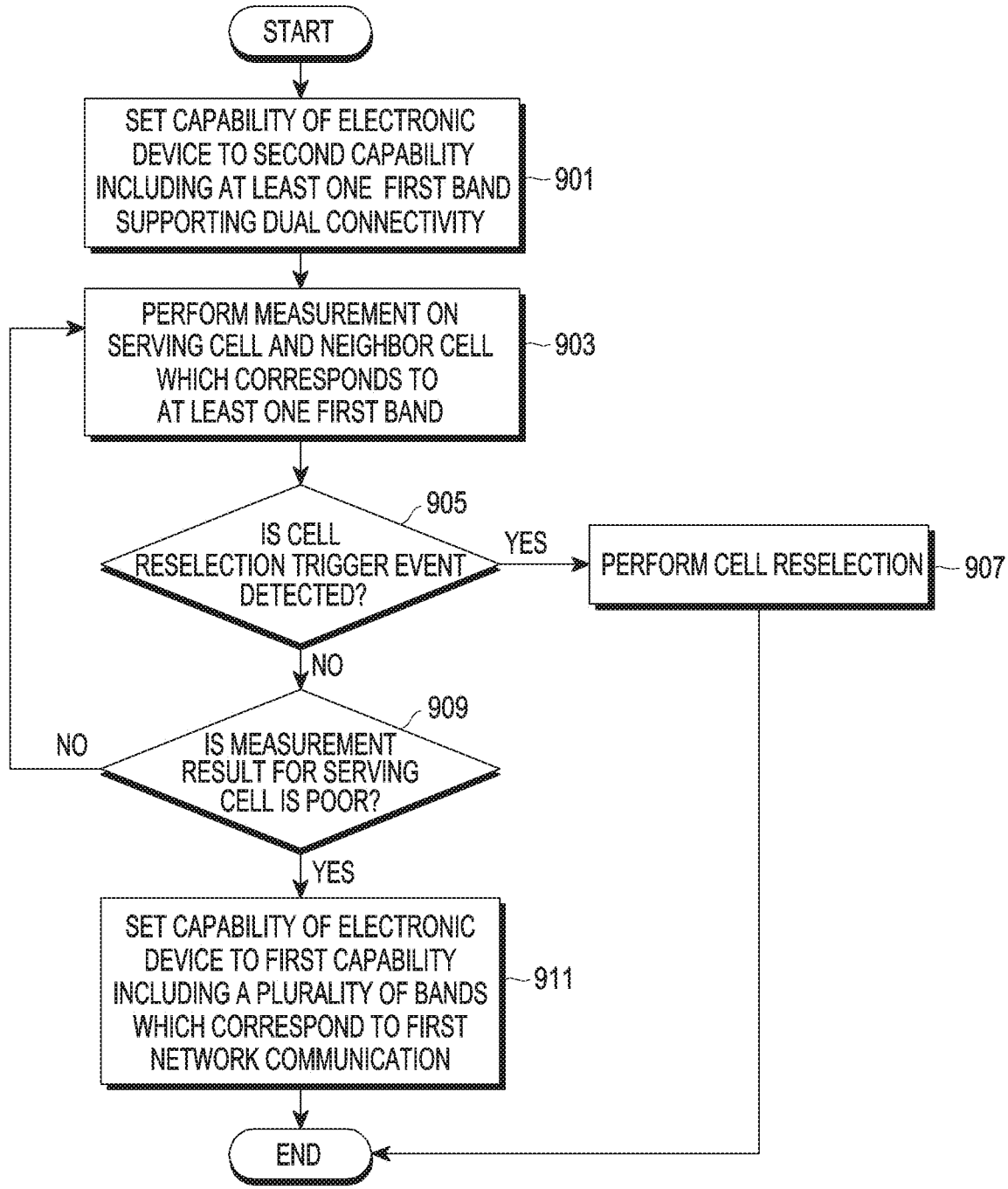
FIG. 9 is a flowchart illustrating an operating method an electronic device according to an embodiment of the disclosure.

FIG. 9 is a flowchart illustrating an operating method of an electronic device according to an embodiment of the disclosure. Operations which have been described already among operations in FIG. 9 will be described briefly.

Referring to FIG. 9, according to various embodiments of the disclosure, an electronic device 101 (e.g., at least one of a first communication processor 212, a second communication processor 214, or an integrated communication processor 260) may set a capability of the electronic device 101 to a second capability including at least one first band supporting dual connectivity in operation 901. For example, the electronic device 101 may deactivate a non-anchor band. As described in FIGS. 8A to 8C, the electronic device 101 may determine whether to deactivate the non-anchor band based on whether a serving cell supports the dual connectivity and/or whether a measurement result for the serving cell satisfies a designated condition. There is no limitation to a condition for deactivating the non-anchor band.

According to various embodiments of the disclosure, after setting the second capability, the electronic device 101 may perform a measurement on the serving cell and perform a measurement on at least some of neighbor cells which correspond to the at least one first band in operation 903. The electronic device 101 may be configured to perform a measurement on the serving cell and a neighbor cell for a cell reselection. The electronic device 101 may perform a measurement on a frequency supporting the dual connectivity among frequencies which correspond to the neighbor cell. As the non-anchor band is deactivated, the electronic device 101 may not perform a measurement on a frequency which does not support the dual connectivity among the frequencies which correspond to the neighbor cell. For example, the electronic device 101 may not perform the measurement on the frequency which does not support the dual connectivity or may perform the measurement on the frequency which does not support the dual connectivity up to a certain number of times. In various embodiments of the disclosure, a fact that the electronic device 101 performs the measurement on the serving cell or the neighbor cell may mean a fact that the electronic device 101 measures at least one of RSRP, RSRQ, RSSI, or SNR of a communication signal received in a band (or a frequency) used by the serving cell or the neighbor cell.

According to various embodiments of the disclosure, the electronic device 101 may identify whether a cell reselection trigger event is detected in operation 905. The cell reselection trigger event may include, for example, satisfaction of cell reselection criteria in 3GPP TS 36.304 or 3GPP TS 38.304, or satisfaction of an arbitrary condition indicating that a communication environment of the neighbor cell is better than a communication environment of the serving cell, and there is no limitation thereto. For example, the electronic device 101 may identify a cell-ranking criterion ($R_s$) for the serving cell and a cell-ranking criterion ($R_n$) for at least one neighbor cell. The cell-ranking criterion for the serving cell and the cell-ranking criterion for the neighbor cell may be determined based on an RSRP measurement result for the serving cell and/or an RSRP measurement result for the neighbor cell, and may, for example, refer to 3GPP TS 36.304 or TS 38.304. The electronic device 101 may identify whether the cell reselection trigger event is detected based on the cell ranking criterion for the serving cell and the cell ranking criterion for neighbor cells. For example, if the cell-ranking criterion for the neighbor cell is higher than a cell-ranking criterion for remaining cells including the serving cell, the electronic device 101 may identify that the cell reselection trigger is detected. The electronic device 101 may identify whether the cell reselection trigger event is detected based on whether a basic criterion (e.g., a cell selection criterion (S) in 3GPP TS 36.304 or 3GPP TS 38.304) for a cell selection is satisfied, whether a restriction rule (e.g., a restriction rule in 3GPP TS 36.304 or 3GPP TS 38.304) is satisfied, a cell priority, and/or the number of beams in a case that rangeToBestCell is set (in a case of an NR communication), there is no limitation to the cell reselection trigger event. A fact that the electronic device 101 detects a cell reselection trigger event associated with a specific cell may be also expressed as a fact that electronic device 101 detects a more suitable cell.

According to various embodiments of the disclosure, upon detecting the cell reselection trigger event (905—yes), the electronic device 101 may perform a cell reselection in operation 907. If a more suitable cell is detected, the electronic device 101 may camp on the more suitable cell. As described above, in operation 903, as the electronic device 101 has deactivated the non-anchor band, the electronic device 101 may perform a measurement on anchor bands in operation 905. According to various embodiments of the disclosure, the electronic device 101 may manage information indicating whether all supported bands are activated or deactivated. For example, the information may be implemented to indicate whether all supported bands are activated or deactivated with a flag form, but there is no limitation to a form or a size of the information indicating whether all supported bands are activated or deactivated.

According to various embodiments of the disclosure, as the electronic device 101 detects the more suitable cell based on the measurement performed on the anchor bands, the electronic device 101 may detect a cell which uses a band supporting the dual connectivity. Accordingly, a possibility that the electronic device 101 unnecessarily camps on a cell which uses a non-anchor band may decrease. In various embodiments of the disclosure, after performing the cell reselection in operation 907, the electronic device 101 may perform one of operation 803 in FIG. 8A, operation 823 in FIG. 8B, or operation 833 in FIG. 8C, or subsequent operations after one of operation 803 in FIG. 8A, operation 823 in FIG. 8B, or operation 833 in FIG. 8C.

According to various embodiments of the disclosure, if the cell reselection trigger event is not detected (905—no), the electronic device 101 may identify whether the measurement result for the serving cell is poor in operation 909. The electronic device 101 may identify whether the measurement result for the serving cell is poor, for example, based on whether a condition, such as Equation 2 is satisfied.

$$RSRP > Thershold - Hysteresis \qquad \text{Equation 2}$$

In Equation 2, RSRP is RSRP of a communication signal from the first cell, Threshold is a threshold value, and Hysteresis may be a value for a hysteresis operation. For example, the threshold value (Threshold) and the value (Hysteresis) for the hysteresis operation in Equation 2 may be set to be equal to a threshold value (Threshold) and a value for a hysteresis operation (Hysteresis) in Equation 1 which indicate a condition for deactivating a non-anchor band, but may be set differently in some cases. As shown in Equations 1 and 2, by applying the value for the hysteresis operation to the condition for deactivating and reactivating the non-anchor band, frequent activation state changes for the non-anchor band may be prevented. Meanwhile, RSRP in Equation 2 may be changed to various measurement results, such as an SNR, RSSI, or RSRQ, and may be changed to a condition which is based on two or more measurement results. The designated condition is not limited as long as a condition indicating that a communication which corresponds to the serving cell is poor.

According to various embodiments of the disclosure, if it is identified that the measurement result for the serving cell is poor (909—yes), the electronic device 101 may set the capability of the electronic device 101 to a first capability including a plurality of bands which correspond to the first network communication in operation 911. Upon identifying that the condition set for reactivating the non-anchor band is satisfied, the electronic device 101 may reactivate the non-anchor band which has been deactivated. For example, the electronic device 101 may activate all supported bands, and may perform a measurement on at least some of the supported bands. In various embodiments of the disclosure, the electronic device 101 may reactivate the non-anchor band if it is identified that designated time elapses after the non-anchor band is deactivated and a communication corresponding to the serving cell is poor. If it is identified that the measurement result for the serving cell is good (909—no), the electronic device 101 may perform a measurement on the serving cell and a neighbor cell which corresponds to the at least one first band in operation 903.

Figure 10A:
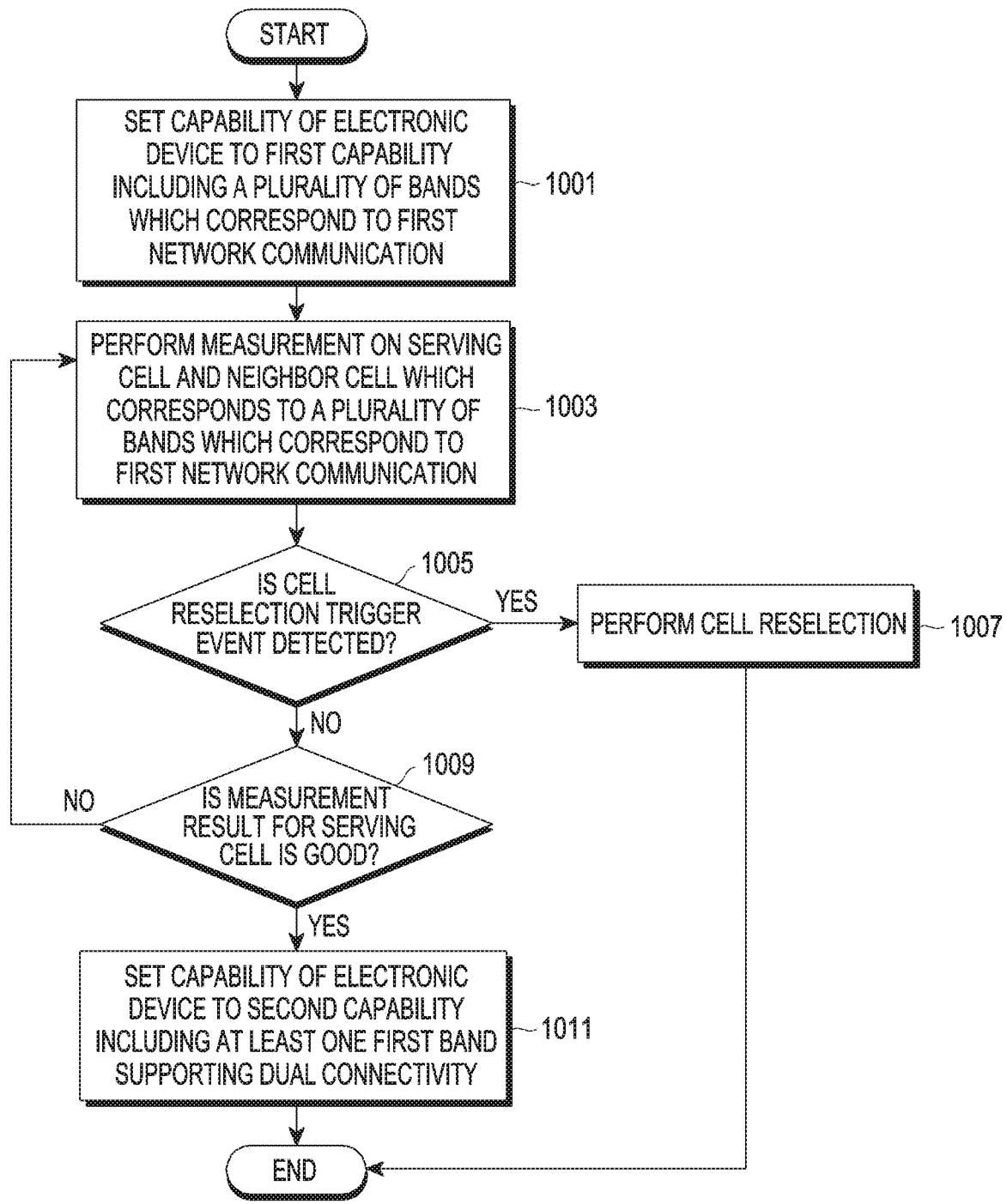
FIG. 10A is a flowchart illustrating an operating method an electronic device according to an embodiment of the disclosure.

FIG. 10A is a flowchart illustrating an operating method of an electronic device according to an embodiment of the disclosure. Operations which have been described already among operations in FIG. 10A will be described briefly.

Referring to FIG. 10A, according to various embodiments of the disclosure, an electronic device 101 (e.g., at least one of a first communication processor 212, a second communication processor 214, or an integrated communication processor 260) may set a capability of the electronic device 101 to a first capability including a plurality of bands which correspond to a first network communication supporting dual connectivity in operation 1001. For example, the electronic device 101 may maintain a state in which a non-anchor band is deactivated before operation 1001, and then reactivate the non-anchor band which has been deactivated in operation 1001. In operation 1003, the electronic device 101 may perform a measurement on a serving cell and a neighbor cell which corresponds to a plurality of bands which correspond to the first network communication. The electronic device 101 may perform a measurement on a frequency which corresponds to the serving cell and a frequency which corresponds to the neighbor cell. As the non-anchor band is activated, the electronic device 101 may perform a measurement on at least some of supported bands.

According to various embodiments of the disclosure, the electronic device 101 may identify whether a cell reselection trigger event is detected in operation 1005. As described above, the cell reselection trigger event may include, for example, satisfaction of cell reselection criteria in 3GPP TS 36.304 or 3GPP TS 38.304, or satisfaction of an arbitrary condition indicating that a communication environment of the neighbor cell is better than a communication environment of the serving cell, and there is no limitation thereto. The electronic device 101 may perform a measurement on the serving cell, and may perform a measurement on at least some of all of an anchor-band and the non-anchor band. The electronic device 101 may identify a cell-ranking criterion ($R_s$) for the serving cell and a cell-ranking criterion ($R_n$) for a neighbor cell which uses at least some of the anchor-band and the non-anchor band. The electronic device 101 may identify whether a cell reselection trigger event is detected based on the cell ranking criterion for the serving cell and the cell ranking criterion for the neighbor cell. The electronic device 101 may identify, for example, a cell having a maximum cell ranking criterion as a more suitable cell. As a process of identifying whether the cell reselection trigger event is detected based on the cell ranking criterion has been described above, a detailed description thereof will be omitted herein.

According to various embodiments of the disclosure, upon detecting the cell reselection trigger event (1005—yes), the electronic device 101 may perform a cell reselection in operation 1007. If a more suitable cell is detected, the electronic device 101 may camp on the more suitable cell. If the cell reselection trigger event is not detected (1005—no), the electronic device 101 may identify whether the measurement result for the serving cell is good in operation 1009. For example, the electronic device 101 may identify whether a condition in Equation 1 is satisfied. If it is identified that the measurement result for the serving cell is not good (1009—no), the electronic device 101 may perform a measurement on the serving cell and the neighbor cell while maintaining the first capability in operation 1003. If it is identified that the measurement result for the serving cell is good (1009—yes), the electronic device 101 may set the capability of the electronic device 101 to a second capability including at least one first band supporting the dual connectivity in operation 1011. For example, if it is identified that the condition in Equation 1 is satisfied, the electronic device 101 may deactivate the non-anchor band. The electronic device 101 may perform a measurement on at least some of bands supporting the dual connectivity among the supported bands.

In connection with an embodiment in FIG. 10A, a process in which the electronic device 101 performs the measurement on the at least some of all bands supported by the electronic device 101, and camps on the more suitable cell based on the measurement result in operations 1003, 1005, and 1007 has been described. According to various embodiments of the disclosure, the electronic device 101 may preferentially search for a band supporting the dual connectivity even if all supported bands are activated. For example, the electronic device 101 may receive an SIB5 from the camped-on serving cell, and the SIB5 may include information about an inter-frequency carrier frequency to be searched. The electronic device 101 may be configured to preferentially search for a frequency supporting the dual connectivity, for example, a frequency corresponding to the anchor band, among inter-frequency carrier frequencies. Here, a preferential search may include setting a search order prior to other frequencies, setting a search period longer than the other frequencies, and/or setting a search frequency higher than the other frequencies. In SIB5, if a frequency supporting the dual connectivity has a higher priority than the serving cell, the electronic device 101 may preferentially search for the frequency supporting the dual connectivity even before a designated period elapses. If the frequency supporting the dual connectivity has a priority equal to or lower than the serving cell, the electronic device 101 may perform a measurement on a frequency having the same priority and a frequency having a low priority even if a first measurement value (e.g., Srxlev) for the serving cell is greater than a first threshold value (e.g., SnonIntraSearchP), and a second measurement value (e.g., Squal) for the serving cell is greater than a second threshold value (e.g., SnonIntraSearchQ).

In various embodiments of the disclosure, the electronic device 101 may perform a measurement on the serving cell and the neighbor cell, and determine a cell-ranking criterion ($R_s$) for the serving cell and a cell-ranking criterion ($R_n$) for the neighbor cell based on a measurement result. For example, in TS 38.304, the cell-ranking criterion ($R_s$) for the serving cell may be defined as $Q_{meas,s}+Q_{hyst}-Qoffset_{temp}$, $Q_{meas,s}$ is an RSRP measurement result for the serving cell, $Q_{hyst}$ is a value set for an hysteresis operation, and $Qoffset_{temp}$ may be, for example, an offset value temporarily applied to a cell applied in TS 38.331. The cell-ranking criterion ($R_n$) for the neighbor cell may be defined as $Q_{meas,n}-$offset$-Qoffset_{temp}$, and $Q_{meas,n}$ is an RSRP measurement result for the neighbor cell. In an inter-frequency case, Qoffset may be determined as $Qoffset_{s,n}$ (an offset between the serving cell and the neighbor cell), or $Qoffset_{s,n}+Qoffset_{frequency}$ (a frequency-specific offset). In various embodiments of the disclosure, $Qoffset_{frequency}$ may be set to a relatively low value for the frequency supporting the dual connectivity, and accordingly, a cell-ranking criterion for a cell supporting the dual connectivity may have a relatively high value. $Qoffset_{frequency}$ is information broadcasted in system information, and at least one of entities in a network may set at least some of a cell reselection parameter so that the frequency supporting the dual connectivity has a relatively high cell-ranking criterion. Alternatively, the electronic device 101 may be configured to have a relatively high cell-ranking criterion for the frequency supporting the dual connectivity. For example, the electronic device 101 may be configured to identify a cell-ranking criterion that an offset for the frequency supporting the dual connectivity is additionally applied. As the offset for the frequency supporting the dual connectivity is applied, the cell-ranking criterion for the frequency supporting the dual connectivity may be set higher than TS 36.304 or TS 38.304.

As described above, in a state that all supported bands are activated, the electronic device 101 may perform a cell reselection procedure according to an existing standard (e.g., 3GPP TS 36.304 or 3GPP TS 38.304), or perform a cell reselection procedure in which a weight is given to a frequency supporting dual connectivity.

Figure 10B:
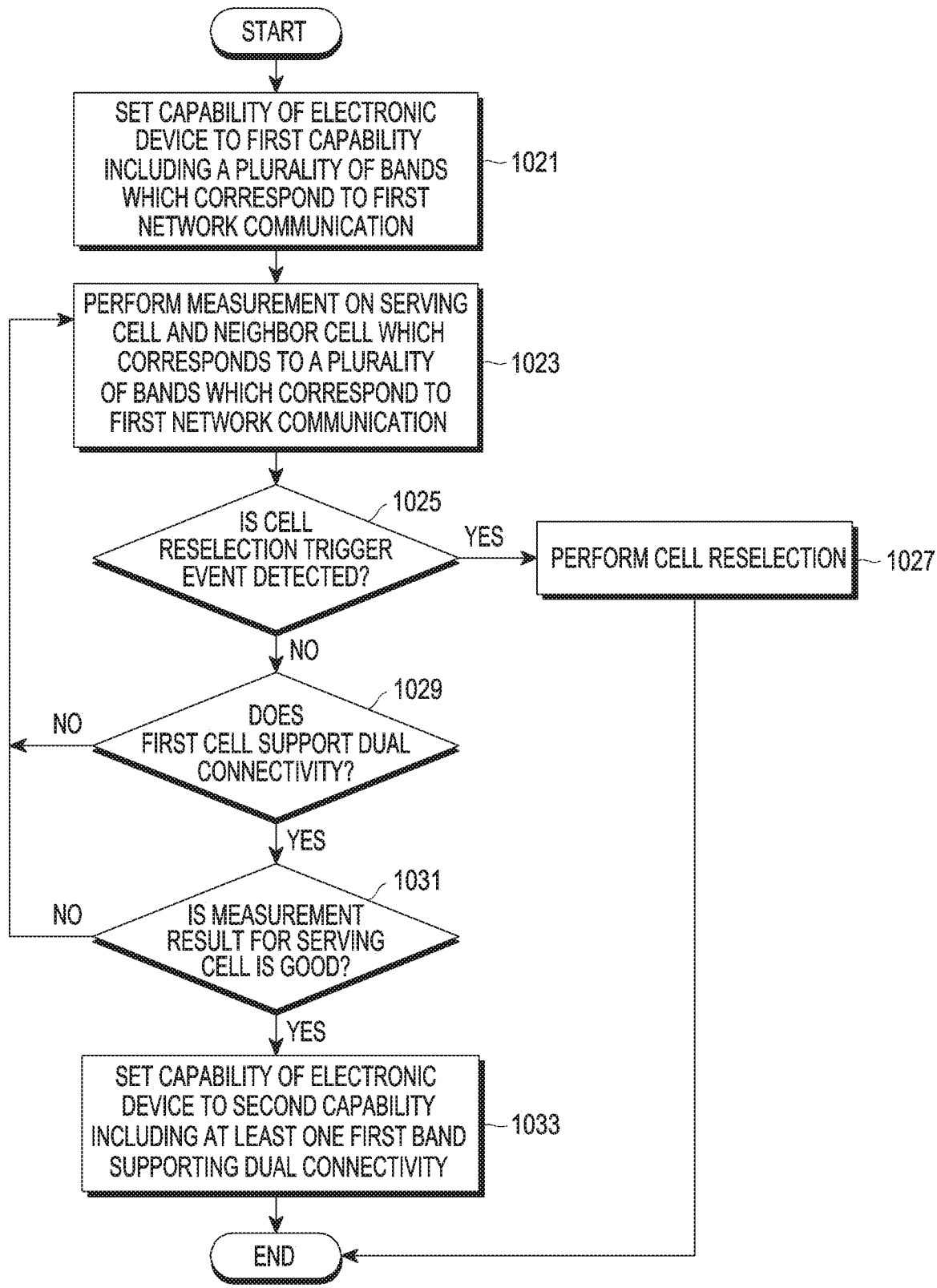
FIG. 10B is a flowchart illustrating an operating method an electronic device according to an embodiment of the disclosure.

FIG. 10B is a flowchart illustrating an operating method of an electronic device according to an embodiment of the disclosure. Operations which have been described already among operations in FIG. 10B will be described briefly.

Referring to FIG. 10B, according to various embodiments of the disclosure, an electronic device 101 (e.g., at least one of a first communication processor 212, a second communication processor 214, or an integrated communication processor 260) may set a capability of the electronic device 101 to a first capability including a plurality of bands which correspond to a first network communication in operation 1021. In operation 1023, the electronic device 101 may perform a measurement on a serving cell and a neighbor cell which corresponds to a plurality of bands which correspond to the first network communication. In operation 1025, the electronic device 101 may identify whether a cell reselection trigger event is detected. If the cell reselection trigger event is detected (1025—yes), the electronic device 101 may perform a cell reselection in operation 1027. If the cell reselection trigger event is not detected (1025—no), the electronic device 101 may identify whether a first cell supports the dual connectivity in operation 1029. For example, the electronic device 101 may identify whether the first cell supports the dual connectivity based on whether upperlayerindication-r15 is true. For example, the electronic device 101 may identify whether a RestrictDCNR value is false among information included in an Attach Accept message received from the serving cell. If the dual connectivity is supported (1029—yes), the electronic device 101 may identify whether a measurement result for the serving cell is good in operation 1031. For example, the electronic device 101 may identify whether the measurement result for the serving cell satisfies a condition in Equation 1. If the dual connectivity is not supported (1029—no), the electronic device 101 may perform a measurement on at least some of supported bands while maintaining the first capability. If it is identified that the measurement result for the serving cell is good (1031—yes), the electronic device 101 may set the capability of the electronic device 101 to a second capability including at least one first band which supports the dual connectivity in operation 1033. The electronic device 101 may deactivate a non-anchor band. If it is identified that the measurement result for the serving cell is not good (1031—no), the electronic device 101 may perform a measurement on the at least some of the supported bands while maintaining the first capability.

Figure 11:
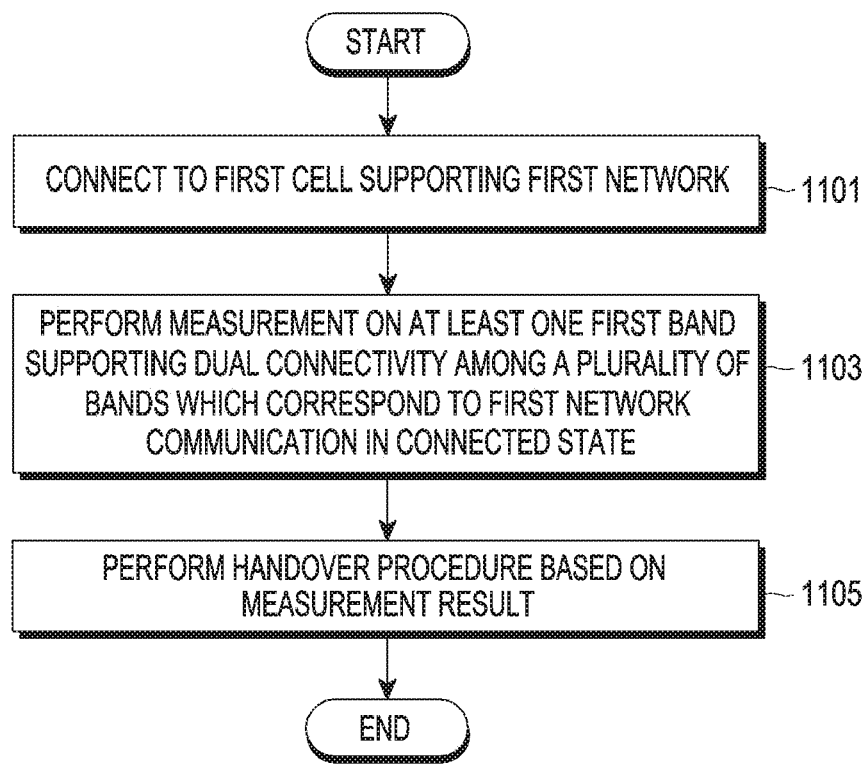
FIG. 11 is a flowchart illustrating an operating method of an electronic device according to an embodiment of the disclosure.

FIG. 11 is a flowchart illustrating an operating method of an electronic device according to an embodiment of the disclosure. Operations which have been described already among operations in FIG. 11 will be described briefly.

Referring to FIG. 11, according to various embodiments of the disclosure, an electronic device 101 (e.g., at least one of a first communication processor 212, a second communication processor 214, or an integrated communication processor 260) may connect to (e.g., RRC connected) a first cell supporting a first network in operation 1101. For example, the electronic device 101 may establish an RRC connection with the first cell after camping on the first cell.

According to various embodiments of the disclosure, the electronic device 101 may perform a measurement on at least one first band supporting dual connectivity among a plurality of bands which correspond to a first network communication in a connected state (e.g., an RRC connected state) in operation 1103. For example, the electronic device 101 may not perform a measurement on a band which does not support the dual connectivity. As described in an operation in an idle state, the electronic device 101 may change a capability of the electronic device 101 from a first capability including all bands supported by the electronic device 101 to a second capability including band supporting the dual connectivity. Alternatively, the electronic device 101 may be configured not to perform a measurement on a band which does not support the dual connectivity while maintaining the capability. The electronic device 101 may deactivate a non-anchor band, for example, based on a measurement result for a serving cell, but there is no limitation to a condition for deactivating the non-anchor band.

According to various embodiments of the disclosure, in operation 1105, the electronic device 101 may perform a handover procedure based on a measurement result. In the handover procedure, the electronic device 101 may receive a measurement condition and/or a reporting condition for handover from an RRC-connected serving cell. For example, the electronic device 101 may receive an RRC connection reconfiguration message from the serving cell, and the RRC connection reconfiguration message may include the measurement condition and/or the reporting criterion for the handover. The electronic device 101 may be configured to measure at least some of the supported bands based on the measurement condition and/or the reporting condition for handover. The electronic device 101 may perform a measurement based on the set capability, and report a measurement result to the serving cell if the measurement result satisfies the reporting condition. If the electronic device 101 deactivates the non-anchor band, the electronic device 101 does not perform a measurement on the non-anchor band, so the electronic device 101 may not report a measurement result for the non-anchor band to the serving cell. The serving cell may perform the handover procedure based on a measurement report received from the electronic device 101. The serving cell may select a target cell to which the electronic device 101 will perform the handover based on the measurement report received from the electronic device 101, and may command the electronic device 101 to hand over to the target cell. The electronic device 101 may release a connection with the serving cell and establish a connection with the target cell based on a received command. As described above, if the electronic device 101 deactivates the non-anchor band, the serving cell does not receive the measurement report for the non-anchor band, so the serving cell may not determine a cell which uses the non-anchor band as the target cell. Accordingly, it may be prevented that the electronic device 101 is connected to a cell which uses the anchor band and then connected to a cell which uses the non-anchor band. In addition, the serving cell may transmit an RRC connection reconfiguration message including a frequency except for the non-anchor band to the electronic device 101. If the electronic device 101 transmits a changed capability to the serving cell, the serving cell may transmit an RRC connection reconfiguration message including a frequency of the anchor band to the electronic device 101.

Figure 12A:
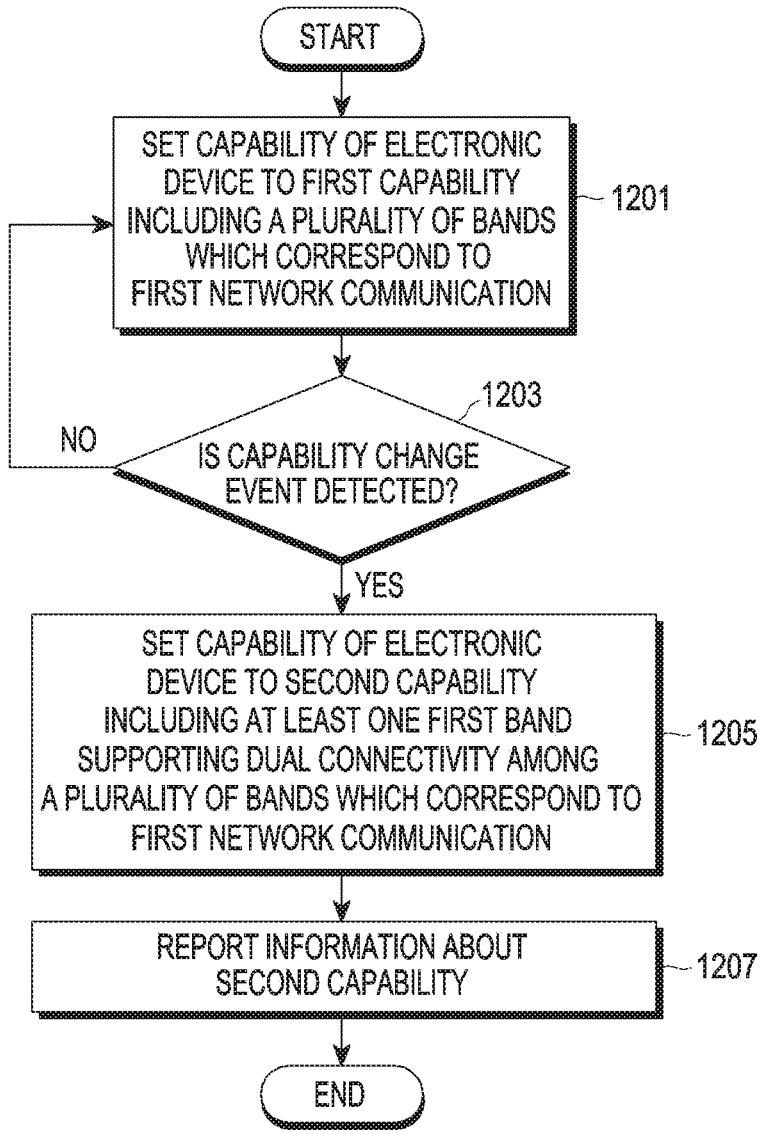
FIG. 12A is a flowchart illustrating an operating method of an electronic device according to an embodiment of the disclosure.

FIG. 12A is a flowchart illustrating an operating method of an electronic device according to an embodiment of the disclosure. Operations which have been described already among operations in FIG. 12A will be described briefly.

Referring to FIG. 12A, according to various embodiments of the disclosure, an electronic device 101 (e.g., at least one of a first communication processor 212, a second communication processor 214, or an integrated communication processor 260) may set a first capability including a plurality of bands which correspond to a first network communication in operation 1201. In operation 1203, the electronic device 101 may identify whether a capability change event is detected. For example, the capability change event may be identification that a currently camped-on serving cell supports the dual connectivity. For example, the capability change event may include identification that a measurement result for a serving cell satisfies a designated condition. For example, the designated condition may include a condition that RSRP and/or a signal to noise ratio (SNR) is greater than a designated threshold value, but there is no limitation thereto. A type of the capability change event is not limited, and for example, if a measurement for a cell reselection is started, the electronic device 101 may change a capability without a special condition.

In various embodiments of the disclosure, if it is identified that the capability change event is detected (1203—yes), the electronic device 101 may set the capability of the electronic device 101 to a second capability including at least one first band which supports the dual connectivity among the plurality of bands which correspond to the first network communication in operation 1205. If the capability change event is not detected (1203—no), the electronic device 101 may maintain the first capability. The electronic device 101 may set the second capability, and then report information about the second capability to the serving cell in operation 1207. The information about the second capability may be included in, for example, a UE capability field in a message for report, but there is no limitation to a type of the message. The electronic device 101 may generate the message based the information about the second capability, and may transmit the generated message to the serving cell. For example, the electronic device 101 may report information about a capability or a capability change in a process of establishing an RRC connection. Alternatively, the electronic device 101 may report the information about the capability or the capability change even after the RRC connection.

Figure 12B:
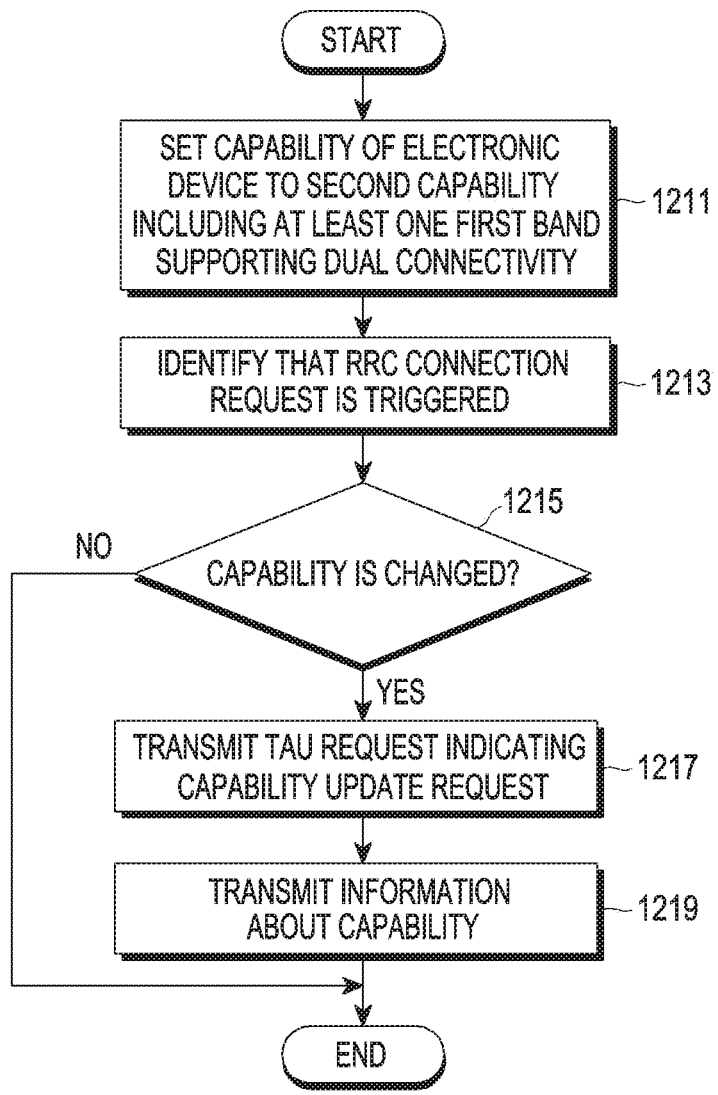
FIG. 12B is a flowchart illustrating an operating method of an electronic device according to an embodiment of the disclosure.

FIG. 12B is a flowchart illustrating an operating method of an electronic device according to an embodiment of the disclosure. Operations which have been described already among operations in FIG. 12B will be described briefly.

Referring to FIG. 12B, according to various embodiments of the disclosure, an electronic device 101 (e.g., at least one of a first communication processor 212, a second communication processor 214, or an integrated communication processor 260) may set a capability of the electronic device 101 to a second capability including at least one first band supporting dual connectivity in operation 1211. For example, if a capability change event is detected, the electronic device 101 may set the second capability. In operation 1213, the electronic device 101 may identify that an RRC connection request is triggered. For example, the electronic device 101 may receive an RRC connection request after camp-on. In operation 1215, the electronic device 101 may identify whether a capability is changed after the capability was last reported. For example, in operation 1211, if the electronic device 101 changes the capability of the electronic device 101 from a first capability to the second capability, the electronic device 101 may identify that the capability is changed. If it is identified that the capability is changed (1215—yes), the electronic device 101 may transmit a TAU request indicating a capability update request in operation 1217. In operation 1219, the electronic device 101 may transmit information about the capability. For example, the electronic device 101 may set a UE radio capability information update needed flag to 1 and/or set an active flag to 1 to transmit the TAU request. The UE radio capability information update request flag is, for example, a field in the TAU request defined in 3GPP TS 34.301. If the UE radio capability information update request flag is set to "1", it may indicate that there is a capability change in a UE. The active flag is included in an EPS update type. If the active flag is set to "0", it may indicate that there is no bearer establishment request, and if the active flag is set to "1", it may indicate that bearer establishment is requested. Accordingly, the TAU request may be transmitted to a network instead of a service request. The electronic device 101 may receive a UE capability inquiry from the network in response to the TAU request. The electronic device 101 may transmit a message including a field of UE capability information in response to the UE capability inquiry. The field of UE capability information may include information about a supported band. If all bands including a non-anchor band are activated, the electronic device 101 may include information about all bands supported by the electronic device 101 in the field of UE capability information to report the field of UE capability information. If the non-anchor band is deactivated, the electronic device 101 may include information about an anchor band among the bands supported by the electronic device 101 in the field of UE capability information to report the field of UE capability information.

Figure 13:
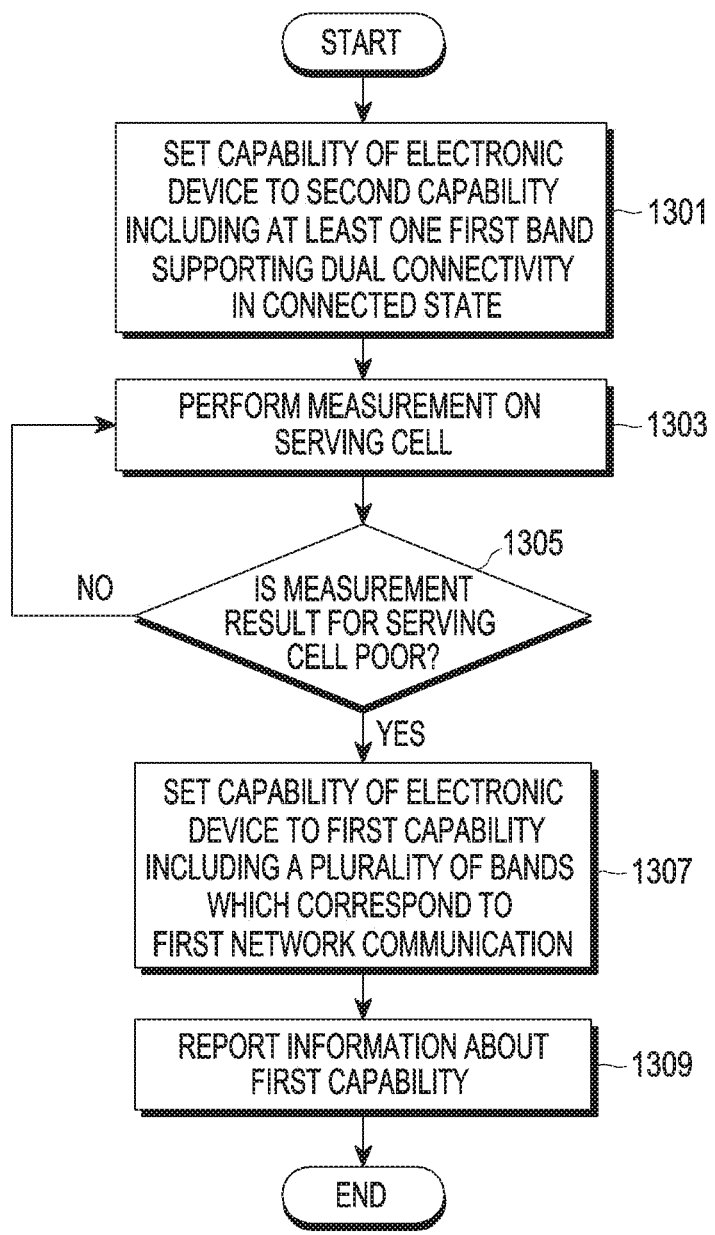
FIG. 13 is a flowchart illustrating an operating method of an electronic device according to an embodiment of the disclosure.

FIG. 13 is a flowchart illustrating an operating method of an electronic device according to an embodiment of the disclosure. Operations which have been described already among operations in FIG. 13 will be described briefly.

Referring to FIG. 13, according to various embodiments of the disclosure, an electronic device 101 (e.g., at least one of a first communication processor 212, a second communication processor 214, or an integrated communication processor 260) may set a capability of the electronic device 101 to a second capability including at least one first band supporting dual connectivity, in a connected state, in operation 1301. For example, the electronic device 101 may deactivate a non-anchor band. For example, the electronic device 101 may deactivate the non-anchor band if a condition for deactivating the non-anchor band is detected. The electronic device 101 may perform a measurement on a serving cell. If RSRP, which is a measurement result for the serving cell, satisfies a condition in Equation 1, the electronic device 101 may deactivate the non-anchor band. As described in connection with Equation 1, as the electronic device 101 applies a value for a hysteretic operation, frequent state transitions for the non-anchor band may be prevented.

In various embodiments of the disclosure, the electronic device 101 may perform the measurement on the serving cell in operation 1303. In operation 1305, the electronic device 101 may identify whether the measurement result for the serving cell is poor. For example, the electronic device 101 may identify whether RSRP for the serving cell satisfies a condition in Equation 2. If it is identified that the measurement result for the serving cell is not poor (1305—no), the electronic device 101 may perform the measurement on the serving cell while maintaining a set second capability. If it is identified that the measurement result for the serving cell is poor (1305—yes), the electronic device 101 may set a capability of the electronic device 101 to a first capability including a plurality of bands which correspond to the first network communication in operation 1307. For example, the electronic device 101 may reactivate the non-anchor band. In operation 1309, the electronic device 101 may report information about the first capability. For example, the electronic device 101 may transmit a TAU request in which a UE radio capability information update request flag is set to 1 and/or an active flag is set to 1. The electronic device 101 may receive a UE capability inquiry. In response to the UE capability inquiry, the electronic device 101 may transmit a message in which information about the first capability is included in a field of UE capability information. In addition, the electronic device 101 may perform a measurement for a handover based on the first capability. To prevent frequent activation/deactivation transitions for the non-anchor band, the electronic device 101 may be configured to perform operation 1307 after time (TimeTotrigger) set for a trigger elapses even if a designated condition is satisfied in operation 1305.

According to various embodiments of the disclosure, although not shown in FIG. 13, the electronic device 101 may report a measurement result for the serving cell and/or a measurement result for a neighbor cell to the serving cell. The electronic device 101 may receive an RRC connection reconfiguration message including at least one reporting condition from the serving cell. The electronic device 101 may identify whether the measurement result for the serving cell and/or the measurement result for the neighbor cell satisfies a reporting condition. If the reporting condition is satisfied, the electronic device 101 may transmit a measurement report. The electronic device 101 may measure a frequency supported by a set capability among frequencies which correspond to the neighbor cell. The electronic device 101 may determine, in parallel, whether to activate or deactivate the non-anchor band or whether to report a measurement result for an activated band.

Figure 14:
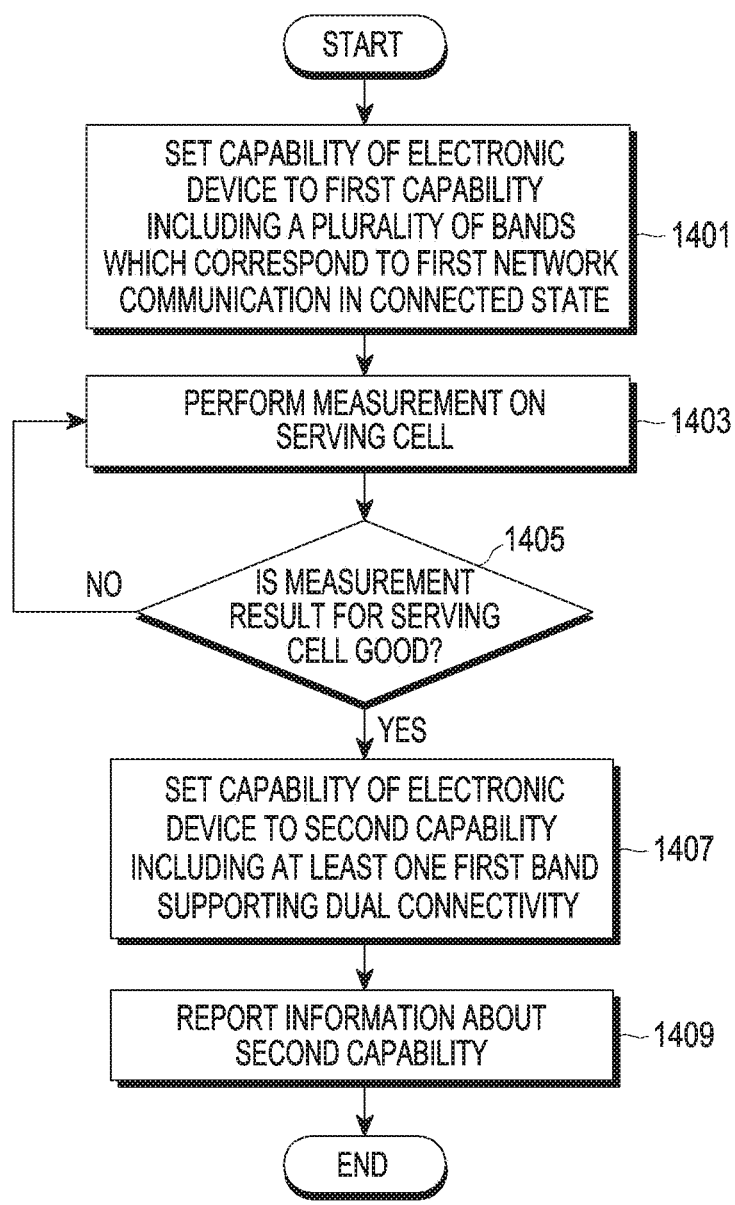
FIG. 14 is a flowchart illustrating an operating method an electronic device according to an embodiment of the disclosure.

FIG. 14 is a flowchart illustrating an operating method of an electronic device according to an embodiment of the disclosure. Operations which have been described already among operations in FIG. 14 will be described briefly.

Referring to FIG. 14, according to various embodiments of the disclosure, an electronic device 101 (e.g., at least one of a first communication processor 212, a second communication processor 214, or an integrated communication processor 260) may set a capability of the electronic device 101 to a first capability including a plurality of bands which correspond to a first network communication, in a connected state (e.g., an RRC connected state), in operation 1401. For example, the electronic device 101 may activate a non-anchor band based on a fact that a measurement result for a serving cell does not satisfy a condition in Equation 2. In operation 1403, the electronic device 101 may perform a measurement on the serving cell. In operation 1405, the electronic device 101 may identify whether the measurement result for the serving cell is good. For example, the electronic device 101 may identify whether the measurement result for the serving cell satisfies a condition in Equation 1. If it is identified that the measurement result for the serving cell is good (1405—yes), the electronic device 101 may set the capability of the electronic device 101 to a second capability including at least one first band supporting the dual connectivity in operation 1407. The electronic device 101 may deactivate a non-anchor band. In operation 1409, the electronic device 101 may report information about the second capability. For example, the electronic device 101 may transmit a TAU request in which a UE radio capability information update request flag is set to 1 and/or an active flag set is to 1. The electronic device 101 may receive a UE capability inquiry, and may transmit a message in which information about the second capability is included in a UE capability field in response to the UE capability inquiry.

Figure 15:
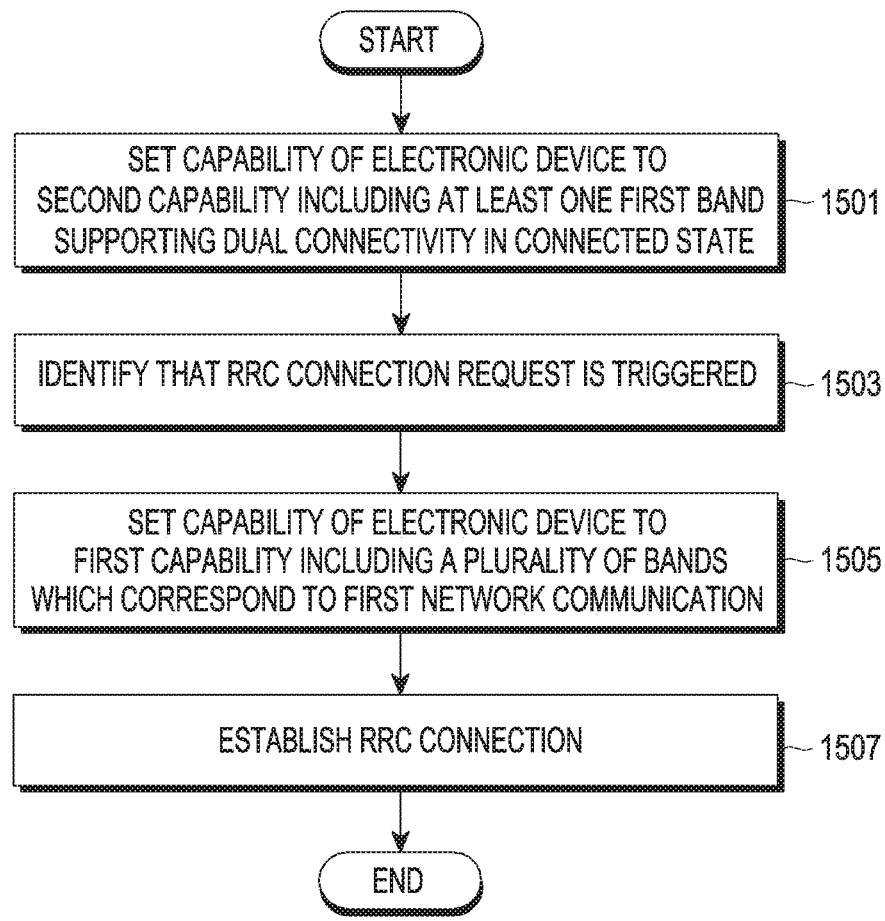
FIG. 15 is a flowchart illustrating an operating method of an electronic device according to an embodiment of the disclosure.

FIG. 15 is a flowchart illustrating an operating method of an electronic device according to an embodiment of the disclosure. Operations which have been described already among operations in FIG. 15 will be described briefly.

Referring to FIG. 15, according to various embodiments of the disclosure, an electronic device 101 (e.g., at least one of a first communication processor 212, a second communication processor 214, or an integrated communication processor 260) may set a capability of the electronic device 101 to a second capability including at least one first band supporting dual connectivity, in an idle state, in operation 1501. For example, the electronic device 101 may deactivate a non-anchor band in the idle state based on a fact various events set to deactivate the non-anchor band described above are detected. In operation 1503, the electronic device 101 may identify that an RRC connection request is triggered. In operation 1505, the electronic device 101 may set the capability of the electronic device 101 to a first capability including a plurality of bands which correspond to a first network communication. The electronic device 101 may reactivate the non-anchor band which has been deactivated before establishing the RRC connection. In operation 1507, the electronic device 101 may establish the RRC connection after activating non-anchor bands. The electronic device 101 may be configured to activate the non-anchor band on a condition that the RRC connection request is triggered, and may also be configured to establish the RRC connection after activating the non-anchor band. Accordingly, after the RRC connection, it may be prevented that the electronic device 101 reports a capability change to a network. If the capability change is frequently reported, there is a possibility that network load may occur due to the report, and the network may have, for example, a burden of resetting a report target frequency and a carrier aggregation combination. The electronic device 101 may be configured to execute a function of deactivating the non-anchor band in the idle state, and not to execute the function of deactivating the non-anchor band in a connected state.

Figure 16A:
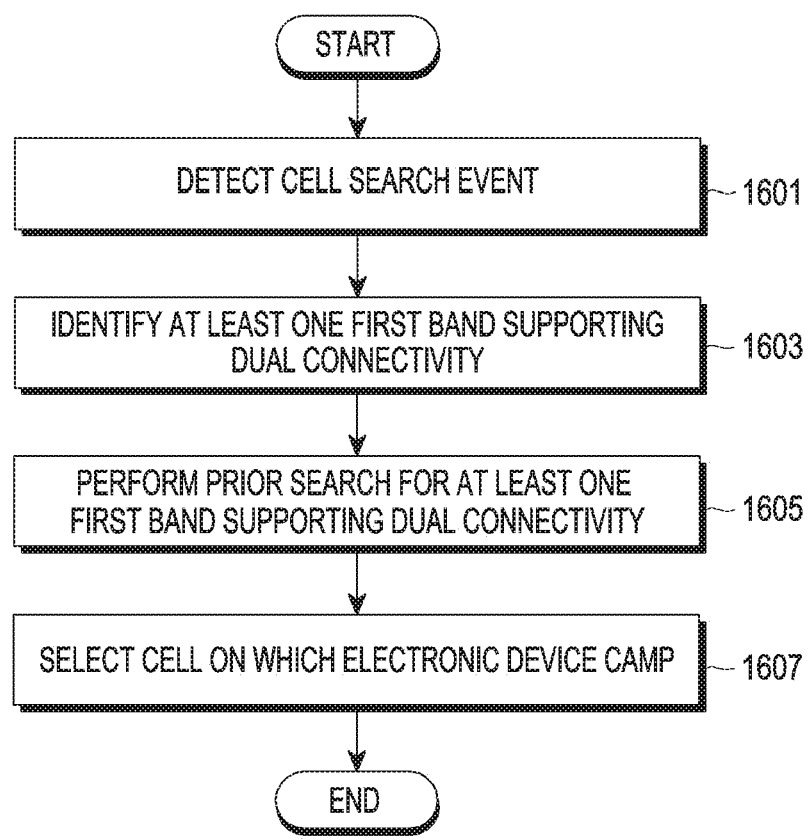
FIG. 16A is a flowchart illustrating an operating method of an electronic device according to an embodiment of the disclosure.

FIG. 16A is a flowchart illustrating an operating method of an electronic device according to an embodiment of the disclosure. Operations which have been described already among operations in FIG. 16A will be described briefly.

Referring to FIG. 16A, according to various embodiments of the disclosure, an electronic device 101 (e.g., at least one of a first communication processor 212, a second communication processor 214, or an integrated communication processor 260) may detect a cell search event in operation 1601. For example, the electronic device 101 may identify that the cell search event is detected if the electronic device 101 is booted, if out of service is identified, or if radio link failure (RLF) is identified. If a cell search event is detected, the electronic device 101 may perform a measurement to select a cell on which the electronic device 101 will camp.

According to various embodiments of the disclosure, the electronic device 101 may identify at least one first band supporting dual connectivity in operation 1603. The electronic device 101 may store information about the at least one first band in advance. In operation 1605, the electronic device 101 may perform a prior search for the at least one first band supporting the dual connectivity. Here, the prior search for the at least one first band may mean that a measurement for a parameter (e.g., RSRP, RSRQ, an RSSI, and/or an SNR) associated with a communication signal received at a frequency which corresponds to the at least one first band is performed prior to a measurement for a parameter associated with a communication signal received at a frequency which corresponds to another band (e.g., a non-anchor band). In operation 1607, the electronic device 101 may select the cell on which the electronic device 101 will camp based on a search result. As the anchor-band is preferentially measured, a possibility that the electronic device 101 camps on a cell supporting the dual connectivity may increase.

Figure 16B:
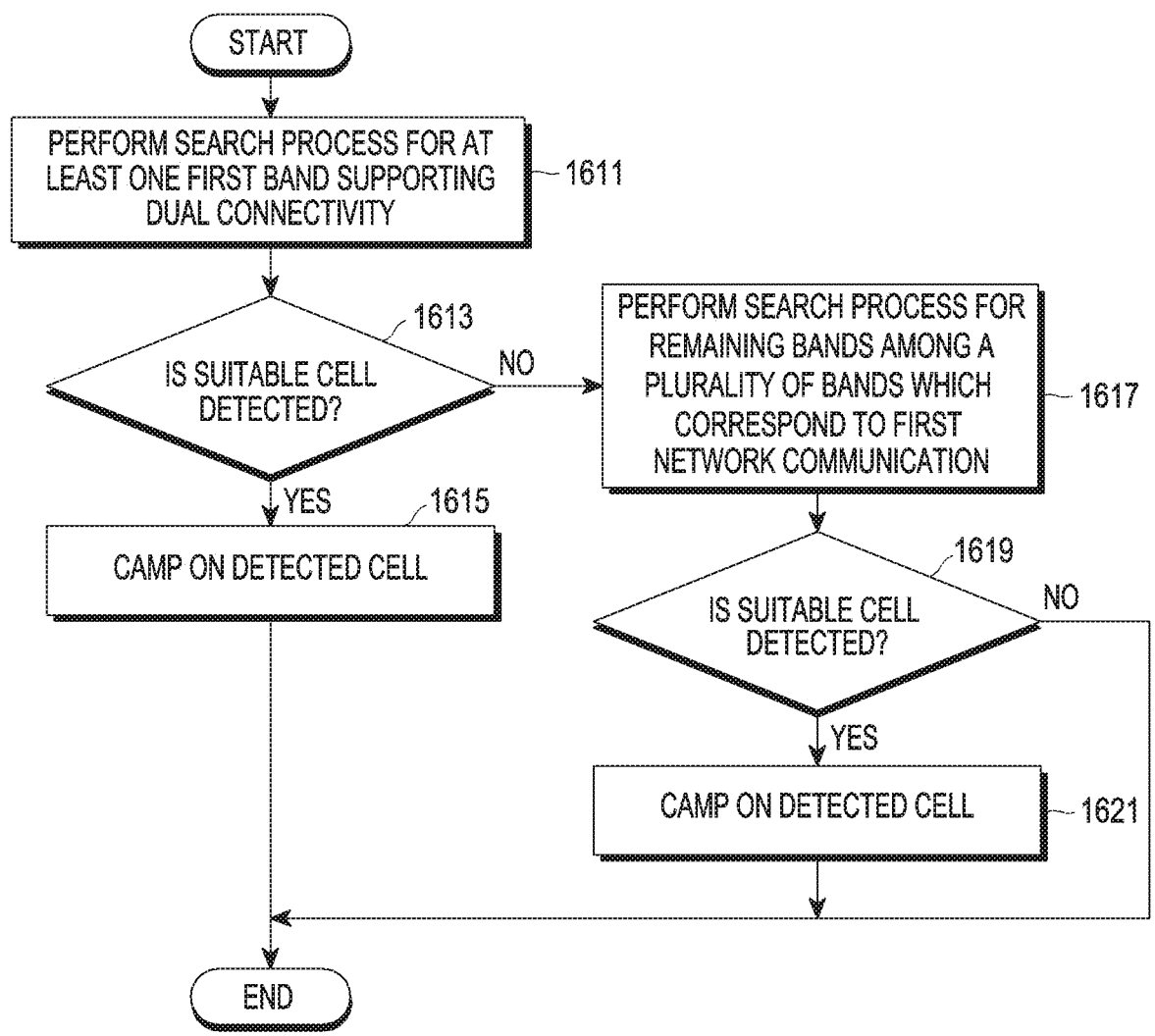
FIG. 16B is a flowchart illustrating an operating method of an electronic device according to an embodiment of the disclosure.

FIG. 16B is a flowchart illustrating an operating method of an electronic device according to an embodiment of the disclosure. Operations which have been described already among operations in FIG. 16B will be described briefly.

Referring to FIG. 16B, according to various embodiments of the disclosure, an electronic device 101 (e.g., at least one of a first communication processor 212, a second communication processor 214, or an integrated communication processor 260) may perform a search process for at least one first band supporting dual connectivity in operation 1611. As described with reference to FIG. 16A, upon detecting a cell search event, the electronic device 101 may preferentially measure an anchor-band. Based on a result of the search process for the at least one first band, the electronic device 101 may identify whether a suitable cell is detected in operation 1613. The electronic device 101, for example, based on 3GPP TS 36.304 or 3GPP TS 38.304, may detect a cell whose cell selection RX level (hereinafter, referred to as Srxlev) is greater than 0, and whose cell selection quality value (hereinafter, referred to as Squal) is greater than 0 as the suitable cell, but there is no limitation to a selection criterion for the suitable cell.

According to various embodiments of the disclosure, if the suitable cell is detected (1613—yes), the electronic device 101 may camp on the detected cell in operation 1615. If the suitable cell is not detected (1613—no), the electronic device 101 may perform a search procedure for remaining bands among a plurality of bands which correspond to a first network communication in operation 1617. The electronic device 101 may perform a measurement on a non-anchor band. The electronic device 101 may identify whether the suitable cell is detected based on a measurement result for the non-anchor band in operation 1619.

In operation 1621, the electronic device 101 may camp on the detected cell. Although not shown in FIG. 16B, if the suitable cell is not detected in operation 1619, the electronic device 101 may camp on any cell.

Figure 17:
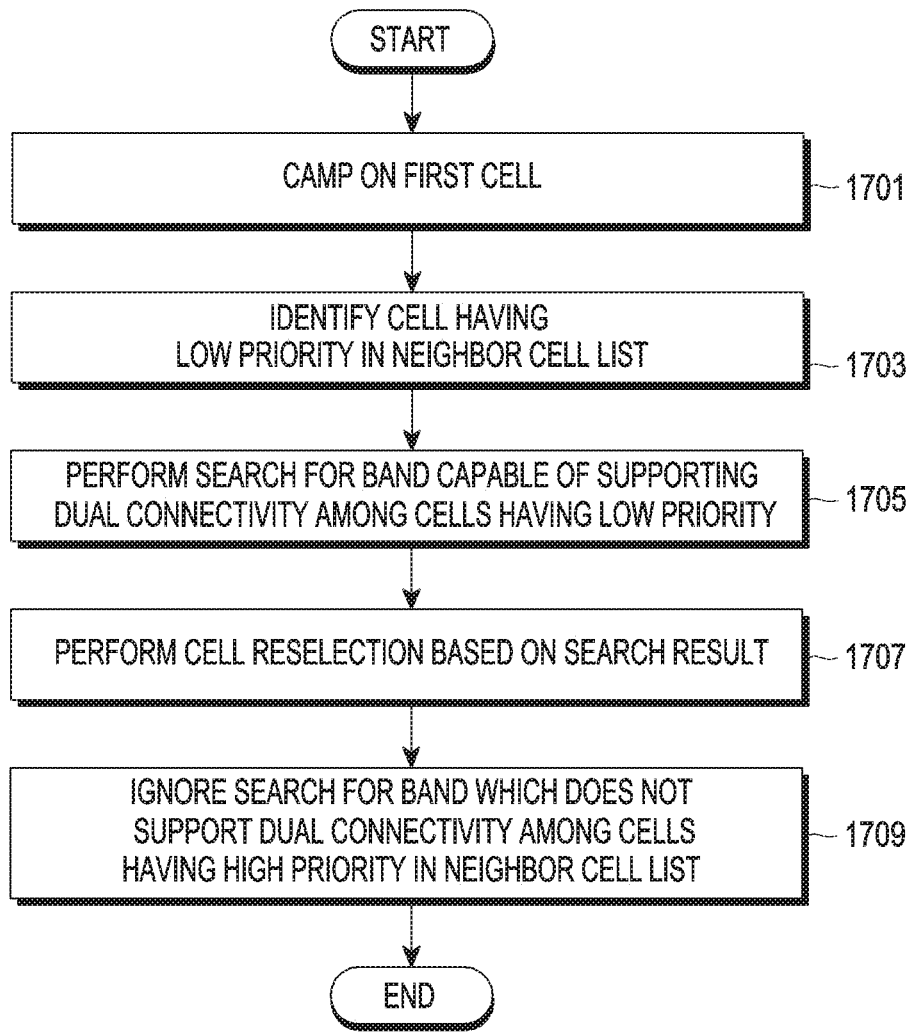
FIG. 17 is a flowchart illustrating an operating method of an electronic device according to an embodiment of the disclosure.

FIG. 17 is a flowchart illustrating an operating method of an electronic device according to an embodiment of the disclosure. FIG. 17 illustrates operations of an electronic device 101 which preferentially supports a band supporting dual connectivity.

Referring to FIG. 17, according to various embodiments of the disclosure, an electronic device 101 (e.g., at least one of a first communication processor 212, a second communication processor 214, or an integrated communication processor 260) may camp on a first cell supporting a first network communication in operation 1701. In operation 1703, the electronic device 101 may identify a cell having a low priority in a neighbor cell list. According to various embodiments of the disclosure, the electronic device 101 may receive a system information block (SIB) from the camped-on first cell. For example, the electronic device 101 may receive a system information block 4 (SIB4) and/or a system information block 5 (SIB5) from the first cell. In various embodiments, the SIB 4 and/or the SIB5 may include configuration information of neighbor cells, and a list of the neighbor cells may be referred to as a neighbor cell list. For example, the SIB 4 may include information about an intra-frequency carrier frequency. Alternatively, the SIB5 may include information about an inter-frequency carrier frequency. In various embodiments of the disclosure, the electronic device 101 may receive, from the first cell, at least one of information about a frequency of a search target or information about a bandwidth for the neighbor cell from the first cell. For example, "InterFreqCarrierFreqInfo" in the SIB5 may include at least one of information about an inter-frequency carrier frequency or information about a bandwidth. The electronic device 101 may identify the frequency of the search target based on at least one of the information about the inter-frequency carrier frequency or the information about the bandwidth. In various embodiments of the disclosure, a fact of receiving information about the neighbor cell may include not only an operation of receiving an explicit neighbor cell list, but also an operation of receiving information about the frequency of the search target. Meanwhile, for example, the SIB5 may include information about a cell reselection priority (or information about a priority for a frequency), and an operation which is based on the priority will be described later. According to various embodiments of the disclosure, the system information block (e.g., the SIB5) received from the first cell, may further include a cell reselection condition (e.g., at least one of at least one threshold value related to signal strength of the serving cell or the neighbor cell).

In operation 1705, the electronic device 101 may perform a search for a band capable of supporting the dual connectivity among cells having a low priority. In operation 1707, the electronic device 101 may perform a cell reselection based on a search result. In operation 1709, the electronic device 101 may ignore a search for a band which does not support the dual connectivity among cells having a high priority in the neighbor cell list. If the cell reselection for the high priority is performed while the dual connectivity is not supported, there is a high probability that a ping-pong phenomenon that a cell which has a low priority and supports the dual connectivity is reselected may occur. Upon reselecting the cell having the low priority, the electronic device 101 may ignore (or skip or not perform) the search for a cell which does not support the dual connectivity among the cells having the high priority. In various embodiments of the disclosure, upon reselecting a cell having the same priority, the electronic device 101 may ignore a search for a cell which does not support dual connectivity as described above, or perform an unrestricted cell reselection.

Figure 18:
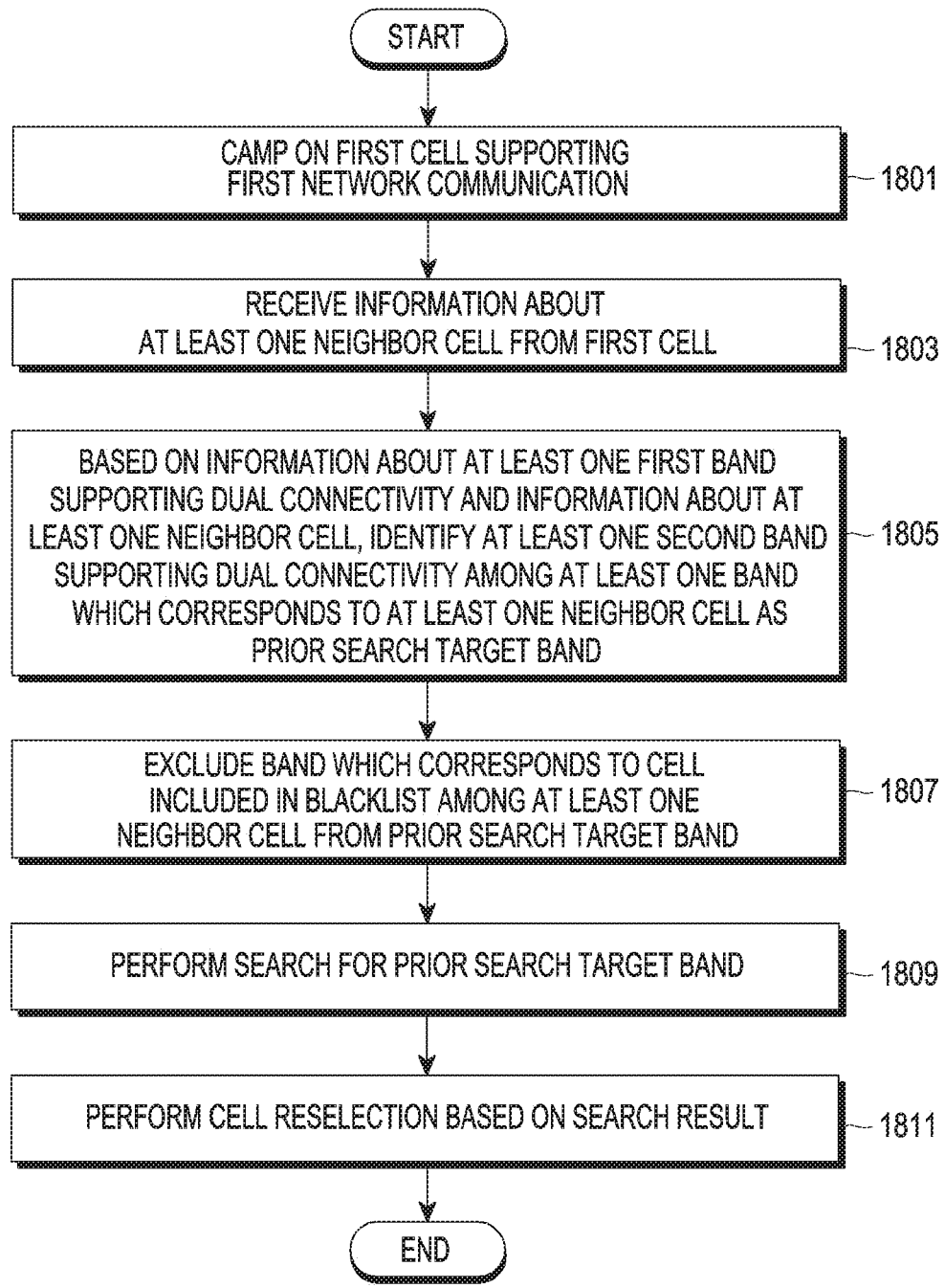
FIG. 18 is a flowchart illustrating an operating method of an electronic device according to an embodiment of the disclosure.

FIG. 18 is a flowchart illustrating an operating method of an electronic device according to an embodiment of the disclosure. Operations which have been described already among operations in FIG. 18 will be described briefly.

Referring to FIG. 18, according to various embodiments of the disclosure, an electronic device 101 (e.g., at least one of a first communication processor 212, a second communication processor 214, or an integrated communication processor 260) may camp on a first cell which supports a first network communication in operation 1801. In operation 1803, the electronic device 101 may receive information about at least one neighbor cell from the first cell. In operation 1805, based on information about at least one first band supporting dual connectivity and the information about the at least one neighbor cell, the electronic device 101 may identify at least one second band supporting the dual connectivity among at least one band which corresponds to the at least one neighbor cell as a prior search target band.

In operation 1807, the electronic device 101 may exclude a band which corresponds to a cell included in a blacklist among the at least one neighbor cell from the prior search target band. For example, the electronic device 101 may manage information about whether a specific cell supports the dual connectivity. Based on upperlayerindication-r15 in SIB2, the electronic device 101 may identify whether a corresponding cell supports the dual connectivity, and store and manage an identified result. The electronic device 101 may manage a blacklist for the prior search target band, and may not perform a prior search for a cell included in the blacklist. For example, if it is identified that all cells belonging to a band which has been searched at least once do not support the dual connectivity based on SIB2 information received from cells included in the band, the band may be designated in the blacklist during an arbitrary time. According to various embodiments of the disclosure, the arbitrary time may be arbitrarily determined by a terminal, or may be determined based on information provided by a base station. In operation 1807, the electronic device 101 may set a band which corresponds to a cell included in a white list among the at least one neighbor cell as the prior search target band. For example, the electronic device 101 may manage information about whether a specific cell supports the dual connectivity. Based on the upperlayerindication-r15 in the SIB2, the electronic device 101 may identify whether a corresponding cell supports the dual connectivity, and store and manage an identified result. The electronic device 101 may manage a white list for the prior search target band, and perform a priority search for a cell included in the white list regardless of the blacklist. The electronic device 101 may set the prior search target band based on at least one of the blacklist or the white list. In operation 1809, the electronic device 101 may perform a search for the prior search target band. In operation 1811, the electronic device 101 may perform a cell reselection based on a search result. According to various embodiments of the disclosure, each of the blacklist or the white list may be managed as a list of a separate band. According to various embodiments of the disclosure, the electronic device 101 may store, for each band, an indicator indicating that a corresponding band is included in the blacklist and an indicator indicating that the corresponding band is included in the white list. According to an embodiment of the disclosure, the electronic device 101 may allocate two bits for each band, one of the two bits indicates whether each band is included in the blacklist, and another of the two bits indicates whether each band is included in the white list.

Figure 19:
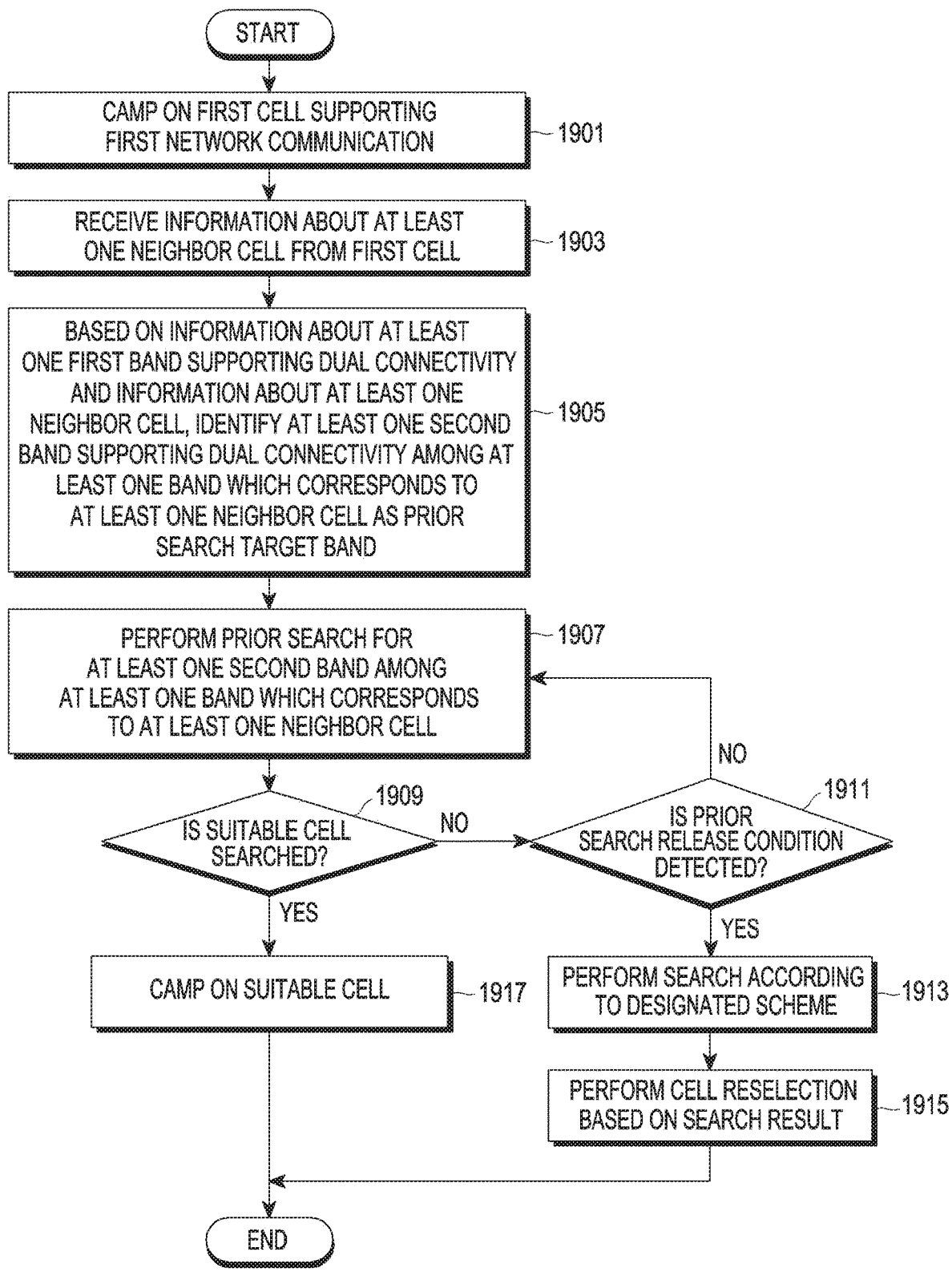
FIG. 19 is a flowchart illustrating an operating method of an electronic device according to an embodiment of the disclosure.

FIG. 19 is a flowchart illustrating an operating method of an electronic device according to an embodiment of the disclosure. Operations which have been described already among operations in FIG. 19 will be described briefly.

Referring to FIG. 19, according to various embodiments of the disclosure, an electronic device 101 (e.g., at least one of a first communication processor 212, a second communication processor 214, or an integrated communication processor 260) may camp on a first cell supporting a first network communication in operation 1901.

In operation 1903, the electronic device 101 may receive information about at least one neighbor cell from the first cell. In operation 1905, the electronic device 101 may identify at least one second band supporting dual connectivity among at least one band which corresponds to at least one neighbor cell as a prior search target band based on information about at least one first band supporting the dual connectivity and information about the at least one neighbor cell. In operation 1907, the electronic device 101 may perform a prior search for the at least one second band among the at least one band which corresponds to the at least one neighbor cell. In operation 1909, the electronic device 101 may identify whether a suitable cell is searched based on a prior search result. If the suitable cell is not searched (1909—no), the electronic device 101 may identify whether a prior search release condition is detected in operation 1911. The prior search release condition may include, for example, a fact that designated time elapses, and/or a fact that the number of search attempts is greater than a designated number. If the prior search release condition is not detected (1911—no), the electronic device 101 may continue perform the prior search in operation 1907. If the prior search release condition is detected (1911—yes), the electronic device 101 may stop the prior search and perform a search according to a designated scheme in operation 1913. The search according to the designated scheme may be, for example, a search according to a standard, and may be a search without considering the prior search. In operation 1915, the electronic device 101 may perform a cell reselection based on a search result according to the designated scheme. If a suitable cell is searched based on the prior search result (1909—yes), the electronic device 101 may camp on the suitable cell in operation 1917.

An electronic device according to various embodiments may include at least one communication processor configured to support a first network communication and a second network communication, and a memory configured to store information about at least one first band supporting dual connectivity for the first network communication and the second network communication among a plurality of bands which correspond to the first network communication supported by the electronic device, and the at least one communication processor may be configured to camp on a first cell supporting the first network communication, after camping on the first cell, perform a measurement on at least some of the at least one first band among the plurality of bands in an idle state, wherein a measurement on a remaining band except for the at least one first band among the plurality of bands is not performed, and perform a cell reselection based on a measurement result for the at least some of the at least one first band.

According to various embodiments of the disclosure, the at least one communication processor may be further configured to perform a measurement on the first cell, identify whether a measurement result for the first cell satisfies a first condition, and based on identifying that the first condition is satisfied, determine to perform a measurement on the at least one first band among the plurality of bands and not to perform the measurement on the remaining band except for the at least one first band.

According to various embodiments of the disclosure, as at least part of identifying whether the measurement result for the first cell satisfies the first condition, the at least one communication processor may be configured to identify whether the measurement result for the first cell is greater than a sum of a threshold value and a value set for a hysteresis operation.

According to various embodiments of the disclosure, the at least one communication processor may be further configured to identify whether the first cell supports the dual connectivity, and based on identifying that the first cell supports the dual connectivity, determine to perform a measurement on the at least one first band among the plurality of bands and not to perform the measurement on the remaining band except for the at least one first band.

According to various embodiments of the disclosure, as at least part of the operation of identifying whether the first cell supports the dual connectivity, the at least one communication processor may be configured to receive system information from the first cell, and based on whether upperlayerindication-r15 included in the system information is true, identify whether the first cell supports the dual connectivity.

According to various embodiments of the disclosure, the at least one communication processor may be further configured to perform a measurement on the first cell while the measurement on the remaining band except for the at least one first band is not performed and the measurement for the at least some of the at least one first band is performed, identify whether a measurement result for the first cell satisfies a second condition, and based on identifying that the second condition is satisfied, perform the measurement on the remaining band except for the at least one first band and perform a measurement on at least some of the plurality of bands.

According to various embodiments of the disclosure, as at least part of identifying whether the measurement result for the first cell satisfies the second condition, the at least one communication processor may be configured to identify whether the measurement result for the first cell is less than a value generated by subtracting a value set for a hysteresis operation from a threshold value.

According to various embodiments of the disclosure, the at least one communication processor may be further configured to change a capability of the electronic device including information about a band supported by the electronic device from a first capability including the plurality of bands to a second capability including the at least one first band.

According to various embodiments of the disclosure, the at least one communication processor may be further configured to transmit a tracking area update (TAU) request indicating an update request for update information for the capability of the electronic device, receive a UE capability inquiry corresponding to the TAU request, and in response to the UE capability inquiry, transmit a message including a UE capability information field including information about the second capability.

According to various embodiments of the disclosure, a UE radio capability information update needed flag in the TAU request may be set to 1, and/or an active flag is in the TAU request may be set to 1.

According to various embodiments, the at least one communication processor is further configured to, before camping on the first cell: perform a first measurement on the at least some of the at least one first band among the plurality of bands, based on a suitable cell not being detected based on a result of the first measurement, perform a second measurement on at least some of the remaining band; and based on at least one of the first measurement or the second measurement, detect the first cell as the suitable cell.

An electronic device according to various embodiments may include at least one communication processor configured to support a first network communication and a second network communication, and a memory configured to store information about at least one first band supporting dual connectivity for the first network communication and the second network communication among a plurality of bands which correspond to the first network communication supported by the electronic device, and the at least one communication processor may be configured to: connect to a first cell supporting the first network communication, while being connected to the first cell, perform a measurement on at least some of the at least one first band among the plurality of bands, wherein a measurement on a remaining band except for the at least one first band among the plurality of bands is not performed, and perform at least some of a handover procedure based on a measurement result for the at least some of the at least one first band.

According to various embodiments of the disclosure, as at least part of performing the at least some of the handover procedure, the at least one communication processor may be configured to receive, from the first cell, at least one report condition for reporting a measurement result for at least one of a serving cell or a neighbor cell, and identify a measurement result which satisfies the least one report condition among the measurement result for the at least one first band, and report the identified measurement result to the first cell.

According to various embodiments of the disclosure, as at least part of performing the at least some of the handover procedure, the at least one communication processor may be configured to receive a handover command to a target cell which is identified based on the identified measurement result, and hand over to the target cell in response to the handover command.

According to various embodiments of the disclosure, the at least one communication processor may be further configured to, perform a measurement on the first cell, identify whether a measurement result for the first cell satisfies a first condition, and based on identifying that the first condition is satisfied, determine to perform a measurement on the at least one first band among the plurality of bands and not to perform the measurement on the remaining band except for the at least one first band.

According to various embodiments of the disclosure, as at least part of identifying whether the measurement result for the first cell satisfies the first condition, the at least one communication processor may be configured to identify whether the measurement result for the first cell is greater than a sum of a threshold value and a value set for a hysteresis operation.

According to various embodiments of the disclosure, the at least one communication processor may be further configured to identify whether the first cell supports the dual connectivity, and based on identifying that the first cell supports the dual connectivity, determine to perform a measurement on the at least one first band among the plurality of bands and not to perform the measurement on the remaining band except for the at least one first band.

According to various embodiments of the disclosure, the at least one communication processor may be further configured to perform a measurement on the first cell while the measurement for the remaining band except for the at least one first band is not performed and the measurement for the at least some of the at least one first band is performed, identify whether a measurement result for the first cell satisfies a second condition, and based on identifying that the second condition is satisfied, perform the measurement on the remaining band except for the at least one first band and perform a measurement on at least some of the plurality of bands.

According to various embodiments of the disclosure, as at least part of identifying whether the measurement result for the first cell satisfies the second condition, the at least one communication processor may be configured to identify whether the measurement result for the first cell is less than a value generated by subtracting a value set for a hysteresis operation from a threshold value.

According to various embodiments of the disclosure, the at least one communication processor may be further configured to change a capability of the electronic device including information about a band supported by the electronic device from a first capability including the plurality of bands to a second capability including the at least one first band.

As is apparent from the foregoing description, according to various embodiments of the disclosure, an electronic device which may camp on or hand over to a cell which corresponds to a frequency supporting dual connectivity and an operating method thereof may be provided. Accordingly, a possibility that the electronic device camps on or hands over to the cell supporting the dual connectivity may increase, so a possibility of a failure to provide the dual connectivity may decrease.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry", etc. A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., a program) including one or more instructions that are stored in a storage medium (e.g., an internal memory 136 or external memory 138) that is readable by a machine (e.g., a master device or a task performing device). For example, a processor of the machine (e.g., the master device or the task performing device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   at least one communication processor configured to support a first network communication and a second network communication; and
   a memory configured to store information about at least one first band supporting dual connectivity for the first network communication and the second network communication among a plurality of bands which correspond to the first network communication supported by the electronic device,
   wherein the at least one communication processor is further configured to:
      camp on a first cell supporting the first network communication,
      after camping on the first cell, perform a measurement on at least some of the at least one first band among the plurality of bands in an idle state, wherein a measurement on a remaining band except for the at least one first band among the plurality of bands is not performed,
      perform a cell reselection based on a measurement result for the at least some of the at least one first band,
      perform a measurement on the first cell,
      identify whether a measurement result for the first cell satisfies a first condition, and
      based on identifying that the first condition is satisfied, determine to perform a measurement on the at least one first band among the plurality of bands and not to perform the measurement on the remaining band except for the at least one first band, and
   wherein, as at least part of identifying whether the measurement result for the first cell satisfies the first condition, the at least one communication processor is configured to identify whether the measurement result for the first cell is greater than a sum of a threshold value and a value set for a hysteresis operation.

2. The electronic device of claim 1, wherein the at least one communication processor is further configured to:
   identify whether the first cell supports the dual connectivity, and
   based on identifying that the first cell supports the dual connectivity, determine to perform a measurement on the at least one first band among the plurality of bands and not to perform the measurement on the remaining band except for the at least one first band.

3. The electronic device of claim 2, wherein, as at least part of identifying whether the first cell supports the dual connectivity, the at least one communication processor is configured to:
   receive system information from the first cell, and
   based on whether upperlayerindication-r15 included in the system information is true, identify whether the first cell supports the dual connectivity.

4. The electronic device of claim 1, wherein the at least one communication processor is further configured to:
   perform a measurement on the first cell while the measurement on the remaining band except for the at least one first band is not performed and the measurement for the at least some of the at least one first band is performed,
   identify whether a measurement result for the first cell satisfies a second condition, and
   based on identifying that the second condition is satisfied, perform the measurement on the remaining band except for the at least one first band and perform a measurement on at least some of the plurality of bands.

5. The electronic device of claim 4, wherein, as at least part of identifying whether the measurement result for the first cell satisfies the second condition, the at least one communication processor is configured to identify whether the measurement result for the first cell is less than a value generated by subtracting a value set for a hysteresis operation from a threshold value.

6. The electronic device of claim 1, wherein the at least one communication processor is further configured to change a capability of the electronic device including information about a band supported by the electronic device from a first capability including the plurality of bands to a second capability including the at least one first band.

7. The electronic device of claim 6, wherein the at least one communication processor is further configured to:
   transmit a tracking area update (TAU) request indicating an update request for update information for the capability of the electronic device,
   receive a user equipment (UE) capability inquiry corresponding to the TAU request, and
   in response to the UE capability inquiry, transmit a message including a UE capability information field including information about the second capability.

8. The electronic device of claim 7, wherein a UE radio capability information update needed flag in the TAU request is set to 1, and/or an active flag is in the TAU request is set to 1.

9. The electronic device of claim 1, wherein the at least one communication processor is further configured to, before camping on the first cell:
   perform a first measurement on the at least some of the at least one first band among the plurality of bands,
   based on a suitable cell not being detected based on a result of the first measurement, perform a second measurement on at least some of the remaining band, and
   based on at least one of the first measurement or the second measurement, detect the first cell as the suitable cell.

10. An electronic device comprising:
at least one communication processor configured to support a first network communication and a second network communication, and
a memory configured to store information about at least one first band supporting dual connectivity for the first network communication and the second network communication among a plurality of bands which correspond to the first network communication supported by the electronic device,
wherein the at least one communication processor is further configured to:
connect to a first cell supporting the first network communication,
while being connected to the first cell, perform a measurement on at least some of the at least one first band among the plurality of bands, wherein a measurement on a remaining band except for the at least one first band among the plurality of bands is not performed,
perform at least some of a handover procedure based on a measurement result for the at least some of the at least one first band,
perform a measurement on the first cell,
identify whether a measurement result for the first cell satisfies a first condition, and
based on identifying that the first condition is satisfied, determine to perform a measurement on the at least one first band among the plurality of bands and not to perform the measurement on the remaining band except for the at least one first band, and
wherein, as at least part of identifying whether the measurement result for the first cell satisfies the first condition, the at least one communication processor is configured to identify whether the measurement result for the first cell is greater than a sum of a threshold value and a value set for a hysteresis operation.

11. The electronic device of claim 10, wherein, as at least part of performing the at least some of the handover procedure, the at least one communication processor is configured to:
receive, from the first cell, at least one report condition for reporting a measurement result for at least one of a serving cell or a neighbor cell, and
identify a measurement result which satisfies the least one report condition among the measurement result for the at least one first band, and report the identified measurement result to the first cell.

12. The electronic device of claim 11, wherein, as at least part of performing the at least some of the handover procedure, the at least one communication processor is configured to:
receive a handover command to a target cell which is identified based on the identified measurement result, and
hand over to the target cell in response to the handover command.

13. The electronic device of claim 10, wherein the at least one communication processor is further configured to:
identify whether the first cell supports the dual connectivity, and
based on identifying that the first cell supports the dual connectivity, determine to perform a measurement on the at least one first band among the plurality of bands and not to perform the measurement on the remaining band except for the at least one first band.

14. The electronic device of claim 10, wherein the at least one communication processor is further configured to:
perform a measurement on the first cell while the measurement for the remaining band except for the at least one first band is not performed and the measurement for the at least some of the at least one first band is performed,
identify whether a measurement result for the first cell satisfies a second condition, and
based on identifying that the second condition is satisfied, perform the measurement on the remaining band except for the at least one first band and perform a measurement on at least some of the plurality of bands.

15. The electronic device of claim 14, wherein, as at least part of identifying whether the measurement result for the first cell satisfies the second condition, the at least one communication processor is configured to identify whether the measurement result for the first cell is less than a value generated by subtracting a value set for a hysteresis operation from a threshold value.

16. The electronic device of claim 10, wherein the at least one communication processor is further configured to change a capability of the electronic device including information about a band supported by the electronic device from a first capability including the plurality of bands to a second capability including the at least one first band.

* * * * *